US012411453B2

(12) United States Patent
Zhu et al.

(10) Patent No.: US 12,411,453 B2
(45) Date of Patent: Sep. 9, 2025

(54) DEVELOPING CARTRIDGE

(71) Applicant: ZHUHAI YANQI TECHNOLOGY CO., LTD., Zhuhai (CN)

(72) Inventors: Yu Zhu, Zhuhai (CN); Ying Wang, Zhuhai (CN)

(73) Assignee: ZHUHAI YANQI TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 19/052,142

(22) Filed: Feb. 12, 2025

(65) Prior Publication Data

US 2025/0181025 A1 Jun. 5, 2025

Related U.S. Application Data

(63) Continuation-in-part of application No. PCT/CN2024/123329, filed on Oct. 8, 2024.

(30) Foreign Application Priority Data

Oct. 8, 2023 (CN) ......................... 202322692719.3
Dec. 8, 2023 (CN) ......................... 202323366031.2
Jun. 27, 2024 (CN) ......................... 202421499471.7

(51) Int. Cl.
*G03G 21/16* (2006.01)
*G03G 15/00* (2006.01)
(Continued)

(52) U.S. Cl.
CPC ..... *G03G 21/1652* (2013.01); *G03G 15/0808* (2013.01); *G03G 15/0863* (2013.01);
(Continued)

(58) Field of Classification Search
CPC ........... G03G 15/0808; G03G 15/0863; G03G 15/80; G03G 21/1619; G03G 21/1633;
(Continued)

(56) References Cited

U.S. PATENT DOCUMENTS 8,913,903 B2 12/2014 Hamaya
10,025,225 B2 7/2018 Itabashi et al.
(Continued)

FOREIGN PATENT DOCUMENTS

CN 206627764 U 11/2017
CN 106919027 B 3/2021
(Continued)

OTHER PUBLICATIONS

International Search Report and Written Opinion issued in corresponding PCT Application No. PCT/CN2024/123329, dated Nov. 21, 2024.

*Primary Examiner* — Sophia S Chen
(74) *Attorney, Agent, or Firm* — Westbridge IP LLC

(57) ABSTRACT

A developing cartridge includes a developing frame, a developing roller, a first drive force receiving member, and a first end cover. The first drive force receiving member is configured to receive a driving force to drive the rotation of the developing roller. The developing cartridge further includes a conductive assembly and a first voltage control member. The conductive assembly is capable of switching internally between an electrically connected state and an electrically non-connected state, and the conductive assembly is provided with a first electrical connection portion that is elastically deformable. The first voltage control member is rotatably mounted on the first end cover and configured to move in response to movement of the first drive force receiving member, thereby switching the conductive assembly between the electrically connected state and the electrically non-connected state, thereby facilitating the miniaturization of the developing cartridge.

20 Claims, 21 Drawing Sheets

(51) Int. Cl.
*G03G 15/08* (2006.01)
*G03G 21/18* (2006.01)

(52) U.S. Cl.
CPC .......... *G03G 15/80* (2013.01); *G03G 21/1619* (2013.01); *G03G 21/1633* (2013.01); *G03G 21/1647* (2013.01); *G03G 21/1821* (2013.01); *G03G 2221/163* (2013.01); *G03G 2221/1657* (2013.01)

(58) Field of Classification Search
CPC ........... G03G 21/1647; G03G 21/1652; G03G 21/1821; G03G 2221/163; G03G 2221/1657
See application file for complete search history.

(56) References Cited

U.S. PATENT DOCUMENTS

| | | | | |
|---|---|---|---|---|
| 10,254,681 | B2 | 4/2019 | Itabashi et al. | |
| 10,444,667 | B2 | 10/2019 | Itabashi et al. | |
| 10,649,369 | B2 | 5/2020 | Itabashi et al. | |
| 11,067,919 | B2 | 7/2021 | Itabashi et al. | |
| 11,221,567 | B2 | 1/2022 | Itabashi et al. | |
| 11,650,518 | B2 | 5/2023 | Itabashi et al. | |
| 11,675,289 | B2 | 6/2023 | Itabashi et al. | |
| 11,988,978 | B2 | 5/2024 | Itabashi et al. | |
| 2022/0100121 | A1 * | 3/2022 | Zhou .................. | G03G 21/1821 |
| 2024/0345506 | A1 | 10/2024 | Itabashi et al. | |
| 2025/0013167 | A1 * | 1/2025 | Peng .................. | G03G 21/1652 |

FOREIGN PATENT DOCUMENTS

| | | | |
|---|---|---|---|
| CN | 214846244 | U | 11/2021 |
| CN | 113176720 | B | 9/2023 |
| JP | H11161016 | A | 6/1999 |
| JP | 2000098680 | A | 4/2000 |
| JP | 2013228547 | A | 11/2013 |
| JP | 5906743 | B2 | 4/2016 |
| JP | 6604197 | B2 | 11/2019 |
| JP | 6881544 | B2 | 6/2021 |
| JP | 7235067 | B2 | 3/2023 |
| JP | 7601125 | B2 | 12/2024 |

* cited by examiner

DEVELOPING CARTRIDGE

CROSS-REFERENCE TO RELATED APPLICATIONS

This application is a continuation-in-part of International Application No. PCT/CN2024/123329, filed on Oct. 8, 2024, which claims priority to Chinese Patent Application No. 202322692719.3, filed on Oct. 8, 2023; Chinese Patent Application No. 202323366031.2, filed on Dec. 8, 2023; and Chinese Patent Application No. 202421499471.7, filed on Jun. 27, 2024. All of the aforementioned applications are incorporated herein by reference in their entireties.

TECHNICAL FIELD

The present disclosure relates to the field of electrophotographic imaging devices, and particularly to a developing cartridge.

BACKGROUND

As is known in the art, imaging devices include a main assembly for mounting developing cartridges/drum cartridges and a detection device for determining information of the developing cartridge installed in the imaging device. For example, the detection device is used to determine whether a developing cartridge newly installed in the imaging device is a new product or to determine information such as the size and capacity of the developing cartridge. This type of existing imaging device can be referred to the contents disclosed in U.S. Pat. No. 10,025,225B2 and its family patents.

An existing developing cartridge detachably installable in such imaging devices incorporates a first drive force receiving member and a detectable device. The first drive force receiving member rotates upon receiving driving force from the imaging device, while the detectable device moves in response to this rotation of the first drive force receiving member. The detectable device can actuate the switching member of the detection device to move between closed and open positions, thus changes the electrical signals of internal circuit of the detection device for detection of the developing cartridge. However, the developing cartridge with this structure requires numerous transmission mechanisms, resulting in complexity and impeding miniaturization of the developing cartridge. Furthermore, the detection process of the developing cartridge with this structure generates mechanical collision noise, degrading user experience.

In the research of such developing cartridges, key ongoing technical challenges for those skilled in the art include simplifying developing cartridge structure and implementing developing cartridge detection methods.

SUMMARY

The objective of the present disclosure is to provide a developing cartridge that advances the aforementioned technology.

The first aspect of the present disclosure discloses a developing cartridge, comprising:

- a developing frame internally provided with a developer chamber configured to accommodate developer;
- a developing roller rotatably disposed on the developing frame;

- a first drive force receiving member configured to receive a driving force for driving rotation of the developing roller;
- a first end cover, connected to the developing frame, to at least partially cover the first drive force receiving member;
- a conductive assembly capable of switching internally between an electrically connected state and an electrically non-connected state, wherein the conductive assembly is provided with a first electrical connection portion that is elastically deformable; and
- a first voltage control member mounted on the first end cover and configured to move in response to movement of the first drive force receiving member, thereby switching the conductive assembly between the electrically connected state and the electrically non-connected state.

Furthermore, the developing cartridge is detachably installable in an imaging device, the imaging device further comprises an openable door, the door having a groundable first inner wall, and the first electrical connection portion is configured to electrically contact the first inner wall.

Furthermore, the first electrical connection portion comprises an anti-slip portion, the anti-slip portion abuts the first inner wall, and at least a portion of the anti-slip portion is made of an elastic conductive material.

Furthermore, the first electrical connection portion is configured to move in a front-rear direction of the developing cartridge.

Furthermore, the first electrical connection portion is configured to move between a first position and a second position under an external force, wherein in the first position, the first electrical connection portion protrudes relative to the developing frame, and in the second position, the first electrical connection portion is retracted relative to the first position.

Furthermore, the first electrical connection portion is disposed on the first end cover, and viewed from a front-rear direction of the developing cartridge, the first electrical connection portion at least partially overlaps with the first voltage control member.

Furthermore, along a longitudinal direction of the developing cartridge, the developing cartridge has a first end portion and an opposing second end portion, the conductive assembly comprises a first conductive member, a second conductive member, a third conductive member, and a fourth conductive member, the first conductive member is disposed at the second end portion, the second conductive member is electrically connected to the first conductive member, the third conductive member is electrically connected to the second conductive member and configured to connect to the fourth conductive member; at least a portion of the second conductive member extends between the first end portion and the second end portion of the developing cartridge, at least a portion of the third conductive member is disposed at the first end portion of the developing cartridge; the fourth conductive member includes the first electrical connection portion; the first voltage control member comprises a first main body portion, a first drive force receiving portion, and a first driving portion, the first drive force receiving portion is disposed on the first main body portion and configured to receive a driving force; the first driving portion is disposed on the first main body portion and is capable of driving the third conductive member or the fourth conductive member so that the third conductive member and the fourth conductive member is capable of switching between the electrically connected state and the electrically non-connected state.

Furthermore, the first conductive member, the second conductive member, the third conductive member and the fourth conductive member are separately formed or at least two are integrally formed.

Furthermore, the fourth conductive member includes a first sub-member and the first electrical connection portion, and the first sub-member is provided with a first sub-gear.

Furthermore, the developing cartridge further comprises a supply roller rotatably supported on the developing frame and configured to supply developer to the developing roller, wherein the second conductive member is the supply roller.

The second aspect of the present disclosure discloses a developing cartridge, comprising:

- a developing frame internally provided with a developer chamber configured to accommodate developer;
- a developing roller rotatably disposed on the developing frame;
- a first drive force receiving member configured to receive a driving force for driving rotation of the developing roller;
- a first end cover, connected to the developing frame, to at least partially cover the first drive force receiving member;
- a conductive assembly capable of switching internally between an electrically connected state and an electrically non-connected state, wherein the conductive assembly is provided with a first electrical connection portion that is elastically deformable; and
- a first voltage control member configured to move in response to movement of the first drive force receiving member, thereby switching the conductive assembly between the electrically connected state and the electrically non-connected state.

Furthermore, the developing cartridge is detachably installable in a drum cartridge having a photosensitive drum, the drum cartridge is detachably installable in an imaging device, the drum cartridge comprises a separation force transmission member, and the developing cartridge comprises a separation force receiving member configured to receive an acting force from the separation force transmission member or a separation force applying member of the imaging device to separate the developing roller from the photosensitive drum, wherein before separation of the developing roller from the photosensitive drum, the first electrical connection portion has a first deformation amount, and after separation of the developing roller from the photosensitive drum, the first electrical connection portion has a second deformation amount, wherein the first deformation amount is greater than the second deformation amount.

Furthermore, the developing cartridge is detachably installable in a drum cartridge having a photosensitive drum, the drum cartridge is detachably installable in a main assembly of an imaging device, and the main assembly comprises a main frame and a mounting cavity configured to mount the developing cartridge, wherein the main frame comprises a first upper wall and a second upper wall, wherein the second upper wall is closer to an inside of the mounting cavity than the first upper wall, wherein the first upper wall is made of a conductive material, the second upper wall is made of a non-conductive material, and the first electrical connection portion is configured to electrically connect with the first upper wall.

Furthermore, the first upper wall comprises a plurality of labels, wherein there is a first gap between the labels and the second upper wall, there is a second gap between the plurality of labels, and the first electrical connection portion makes electrical contact with the first gap or the second gap.

Furthermore, the developing cartridge is detachably installable in a drum cartridge having a photosensitive drum, the drum cartridge is detachably installable in an imaging device, and the developing cartridge further comprises a storage unit having a ground terminal capable of electrically connecting with a contact pin of the imaging device, and the first electrical connection portion is capable of electrically connecting with the ground terminal.

Furthermore, along a longitudinal direction of the developing cartridge, the developing cartridge has a first end portion and an opposing second end portion, the conductive assembly comprises a first conductive member, a second conductive member, a third conductive member, and a fourth conductive member, the first conductive member is disposed at the second end portion, the second conductive member is electrically connected to the first conductive member, the third conductive member is electrically connected to the second conductive member and configured to connect to the fourth conductive member; at least a portion of the second conductive member extends between the first end portion and the second end portion of the developing cartridge, at least a portion of the third conductive member is disposed at the first end portion of the developing cartridge; the fourth conductive member includes the first electrical connection portion; the first voltage control member comprises a first main body portion, a first drive force receiving portion, and a first driving portion, the first drive force receiving portion is disposed on the first main body portion and configured to receive a driving force; the first driving portion is disposed on the first main body portion and is capable of driving the third conductive member or the fourth conductive member so that the third conductive member and the fourth conductive member is capable of switching between the electrically connected state and the electrically non-connected state.

Furthermore, the first conductive member, the second conductive member, the third conductive member and the fourth conductive member are separately formed or at least two are integrally formed.

Furthermore, the imaging device comprises a detection device and a grounding terminal, the detection device comprises a detection unit, a power source and a switching member capable of forming a conductive circuit, wherein the switching member is movable between a closed position and an open position, and the conductive assembly is capable of electrically connecting the switching member and the grounding terminal.

Furthermore, the developing cartridge further comprises a first force applying portion disposed on the first conductive member or formed separately from the first conductive member, wherein the first force applying portion is configured to apply a force to a switching member of the detection device when the developing cartridge is installed in the imaging device to move the switching member from an initial position to a closed position.

Furthermore, the developing cartridge further comprises a deceleration mechanism disposed at a first end portion of the developing cartridge, wherein the deceleration mechanism comprises at least a first transmission member and a second transmission member, wherein the first transmission member comprises a third gear portion and a fourth gear portion, a diameter of the third gear portion is smaller than that of the fourth gear portion, wherein the second transmission member comprises a fifth gear portion and a second gear portion, the fourth gear portion meshes with a first gear portion of the first drive force receiving member, the third gear portion meshes with the fifth gear portion, and the second gear portion meshes with a first drive force receiving portion of the first voltage control member.

The developing cartridge with the above structure features simplified construction that facilitates the miniaturization of the developing cartridge.

BRIEF DESCRIPTION OF THE DRAWINGS

One or more embodiments are illustrated by means of the corresponding drawings, which do not constitute a limitation of the embodiments, connection ports having the same reference numerals in the drawings are shown as similar connection ports, and the drawings do not constitute a limitation of proportion. In the drawings.

DETAILED DESCRIPTION OF THE EMBODIMENTS

The present disclosure will be described in further detail with reference to the embodiments and accompanying drawings.

Embodiment 1

As shown in FIGS. 1-14, the present embodiment provides an imaging device P comprising a main assembly P1, a door P2, a detection device 50, and a separation force applying member (not shown in the figures). The main assembly P1 comprises a mounting cavity P3 and a main frame P4. The mounting cavity P3 is configured to mount the developing cartridge 10, and comprises a second inner wall P31 with a plurality of grounding conductive members P311 exposed toward the inside of the mounting cavity P3 from the inner wall.

The main frame P4 surrounds the mounting cavity P3 and has at least a portion made of conductive material. The main frame P4 comprises a conductive and groundable first upper wall P41 and a non-conductive second upper wall P42. The second upper wall P42 is positioned closer to the inside of the mounting cavity P3 than the first upper wall P41. The first upper wall P41 is made of conductive metal material, while the second upper wall P42 is made of non-conductive resin. The second upper wall P42 comprises a first surface P43 and a second surface P44 forming a height difference, with the second surface P44 being further from the first upper wall P41 compared to the first surface P43. The door P2 can open and close the mounting cavity P3 and is rotatably mounted on the main frame P4. The door P2 comprises a conductive and groundable first inner wall P21.

In some embodiments, labels P47 are attached to the first upper wall P41 for recording information about installation and use of the developing cartridge. A second gap P472 is formed between adjacent labels P47, and a first gap P471 is formed between the labels P47 and the second upper wall P42.

Figure 1:
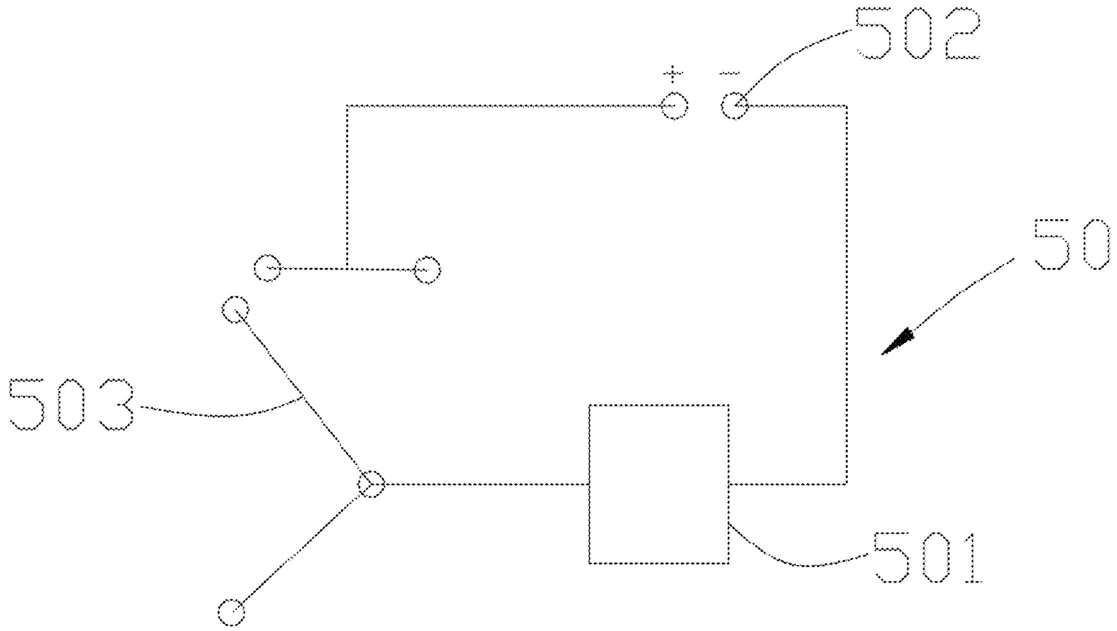
FIG. 1 is a schematic diagram showing the internal circuit of the detection device when the switching member is in the open position (initial position) in the present disclosure.

The detection device 50 comprises a detection unit 501, a power source 502, a switching member 503, and a processor (not shown). The detection unit 501, power source 502, and switching member 503 can be electrically connected to form a conductive circuit, with the switching member 503 controlling circuit making and breaking. The detection unit 501 can detect changes in electrical signals based on circuit making and breaking, transmit different electrical signals to the processor, and thereby determine basic information about the developing cartridge. The switching member 503, at least partially constructed of conductive material, is configured as a movable member with three positions: initial position, closed position, and open position. As shown in FIG. 1, in the initial position (also referred to as the open position), the switching member 503 maintains a non-conducting circuit state. In the closed position (FIG. 2), the switching member 503 closes the circuit, enabling conduction and allowing the detection unit 501 to detect electrical signals. In the open position (FIG. 3), the switching member 503 returns to a non-conducting circuit state. As the movable member transitions between closed and open positions, the electrical signal (such as voltage) of the detection unit 501 changes, enabling determination of the information of developing cartridge.

In some embodiments, the switching member 503 may be omitted, with the detection unit electrically connected to a conductive part of the developing cartridge (such as the detectable device to be described below), thereby affecting the detection unit's electrical signal through voltage changes in the detectable device. This allows the processor to determine basic information about the developing cartridge based on different electrical signals.

In other embodiments, the detection unit may be a capacitive sensor, pressure sensor, photoelectric sensor, electromagnetic sensor or the like.

Figure 2:
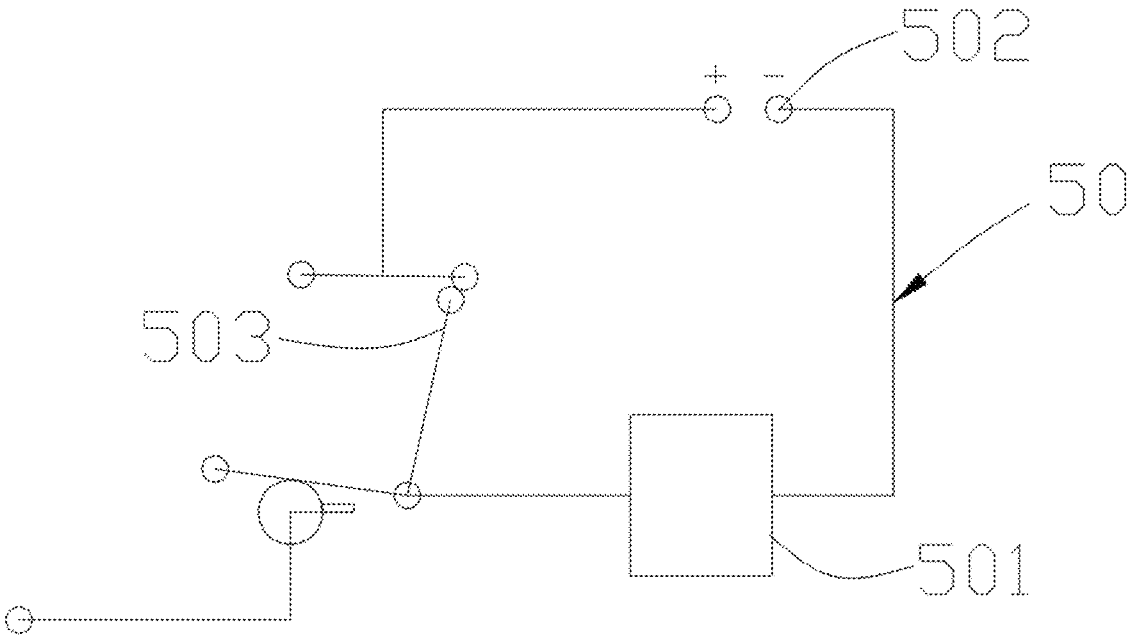
FIG. 2 is a schematic diagram showing the internal circuit of the detection device when the switching member is in the closed position in the present disclosure.
Figure 3:
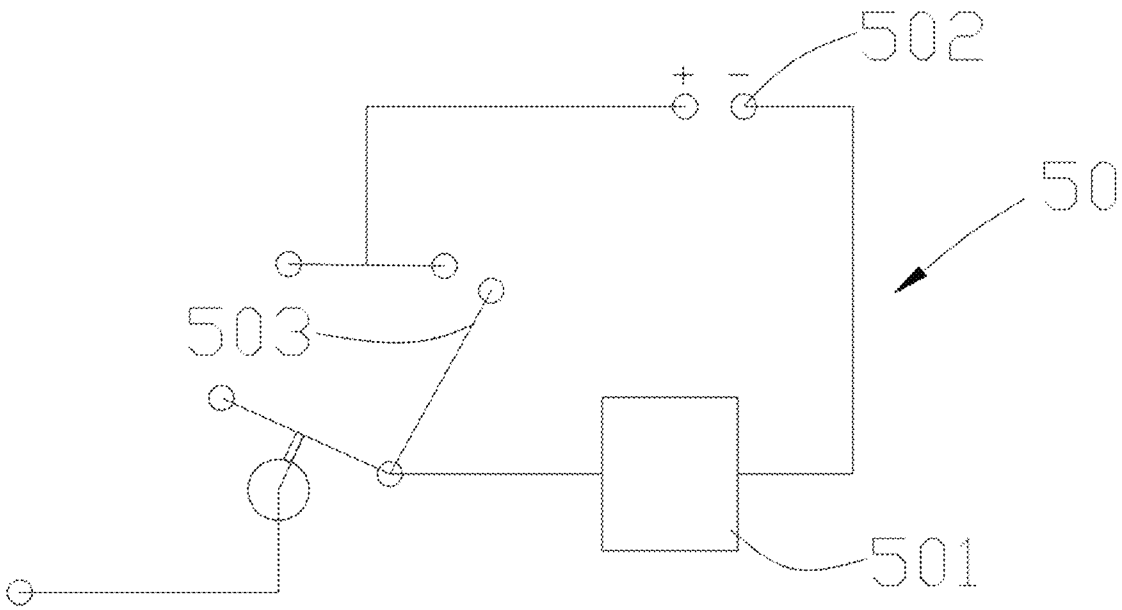
FIG. 3 is a schematic diagram showing the internal circuit of the detection device when the switching member is in the open position in the present disclosure.

In the present embodiment, the switching member 503 is made of conductive material and is configured as a movable member having a closed position and an open position. Specifically, at least a portion of the switching member 503 is disposed on a swing arm 504, allowing the switching member 503 to move between the closed and open positions as the swing arm 504 pivots. As shown in FIG. 1, in the open position (which may also serve as the initial position), the switching member 503 is in a non-conducting state. In the closed position (as shown in FIG. 2), the switching member 503 closes the circuit, causing the circuit to be conducted and allowing the detection unit 501 to detect electrical signals. The separation force applying member (not shown) is disposed in the main assembly P1 and can apply an acting force to developing cartridge 10.

Figure 4:
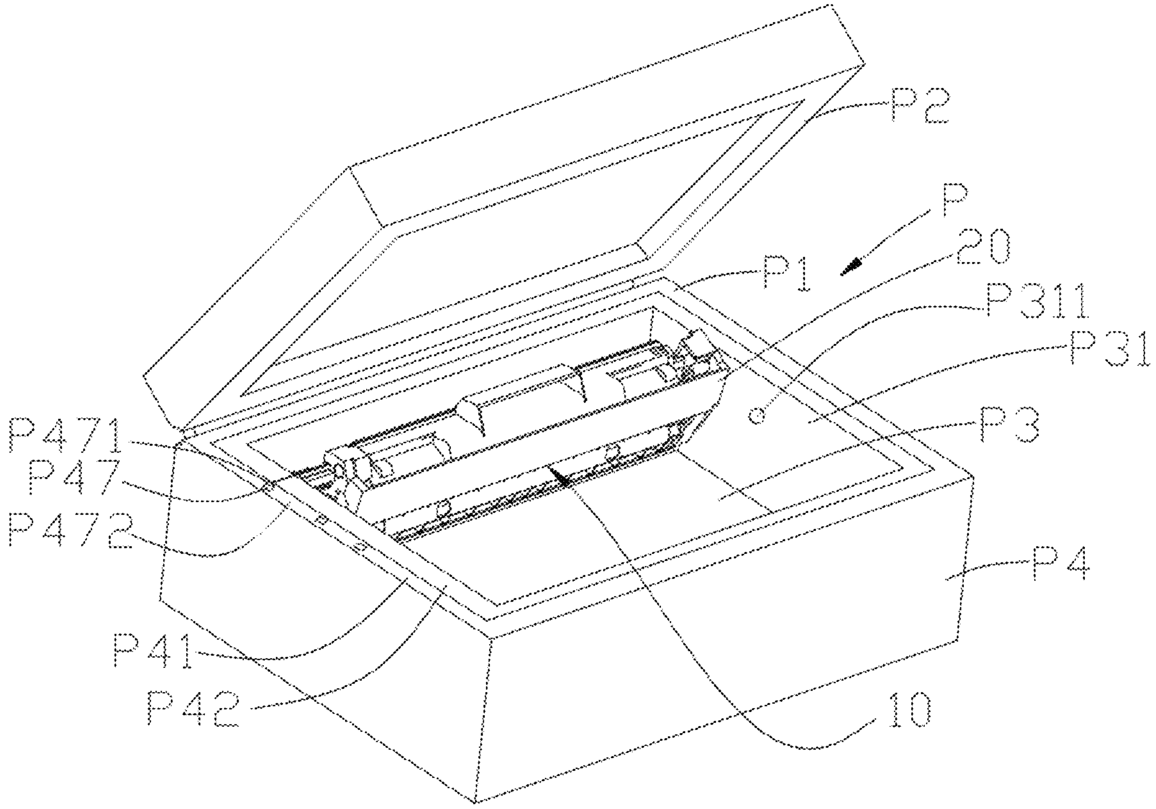
FIG. 4 is a structural view showing the developing cartridge of Embodiment 1 installed in the imaging device in the present disclosure.
Figure 5A:
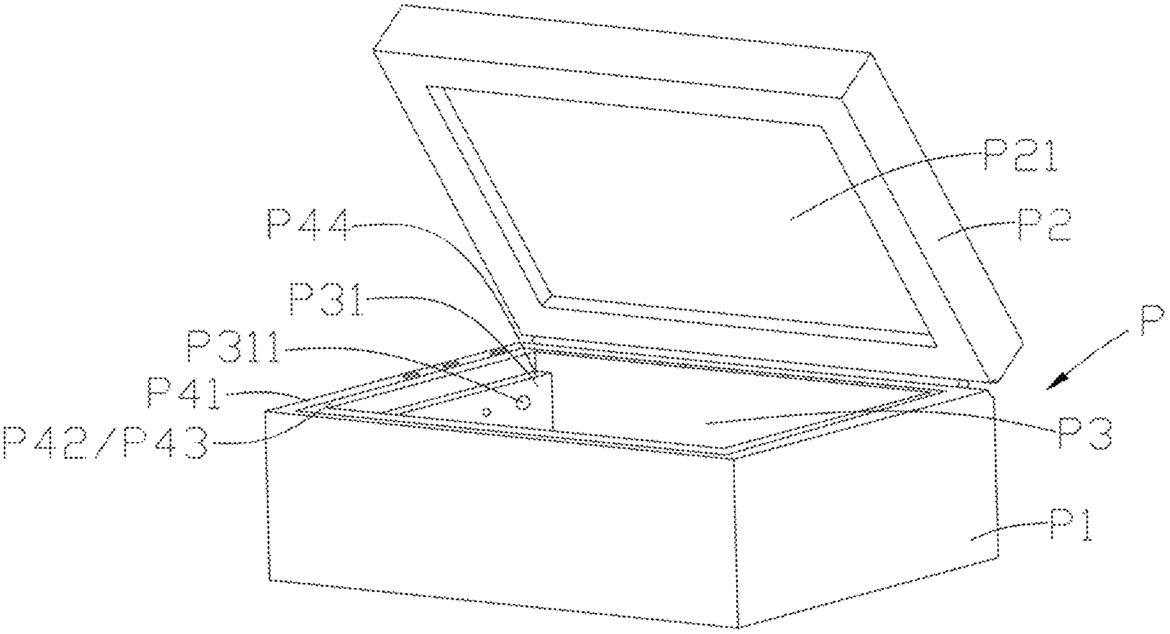
FIG. 5*a* is a simplified structural view of the imaging device in Embodiment 1 in the present disclosure.
Figure 5B:
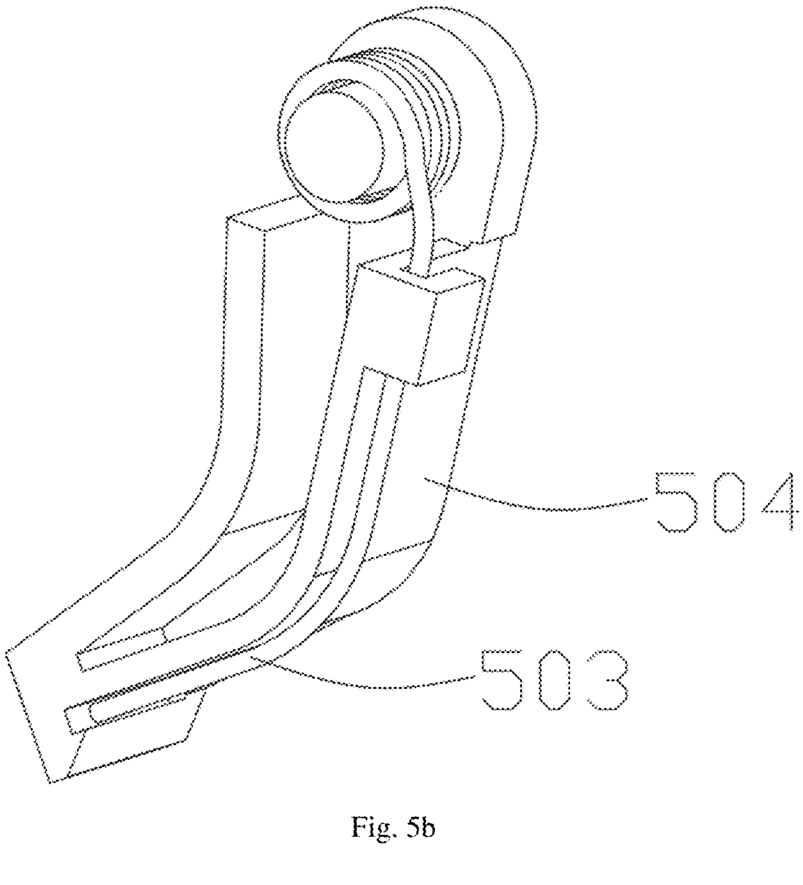
FIG. 5*b* is a structural view showing the switching member and swing arm in Embodiment 1 in the present disclosure.
Figure 6:
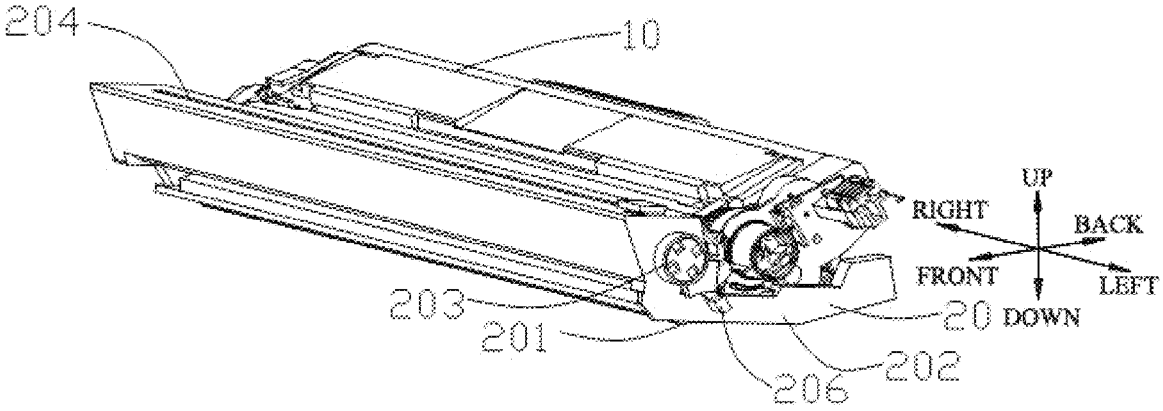
FIG. 6 is a structural view showing the developing cartridge of Embodiment 1 installed in the drum cartridge in the present disclosure.

As shown in FIGS. 4-6, the developing cartridge 10 is detachably installable in a drum cartridge 20 having a photosensitive drum 201, with the drum cartridge 20 being detachably installable in the main assembly P1 of the imaging device P. For ease of description, the direction generally parallel to the installation direction of the drum cartridge 20 into the electrophotographic imaging device P is defined as the front-rear direction, with the side having the photosensitive drum 201 being the front side and the opposite side being the rear side. The direction parallel to the longitudinal direction of the drum cartridge 20 is defined as the left-right direction, with the side receiving driving force from the electrophotographic imaging device P being the left side and its opposite side being the right side. The direction perpendicular to both the front-rear direction and left-right direction is defined as the up-down direction.

Figure 7:
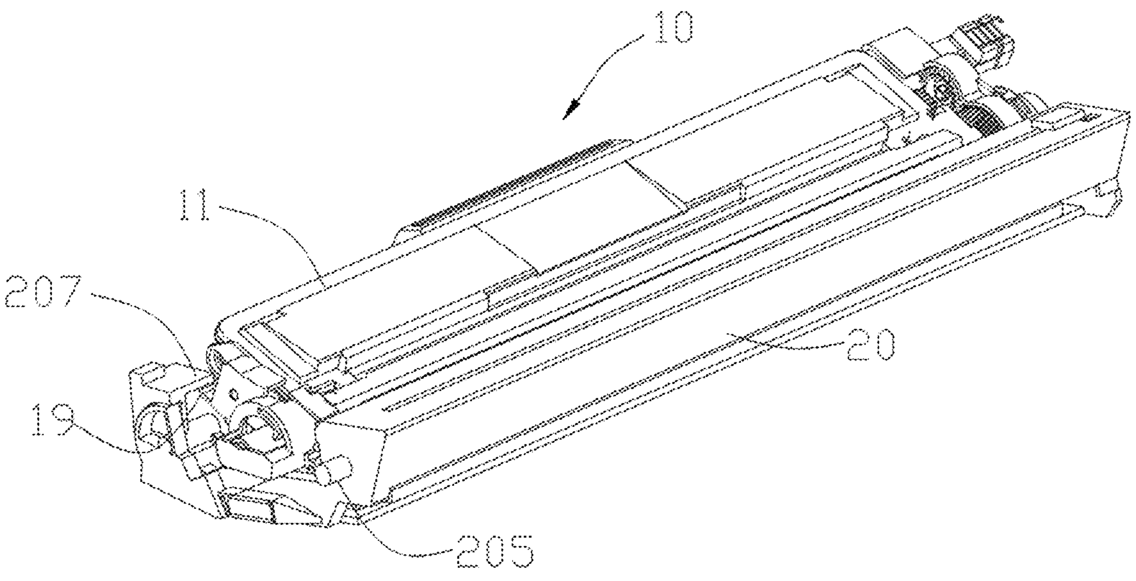
FIG. 7 is a structural view showing another angle of the developing cartridge of Embodiment 1 installed in the drum cartridge in the present disclosure.
Figure 8:
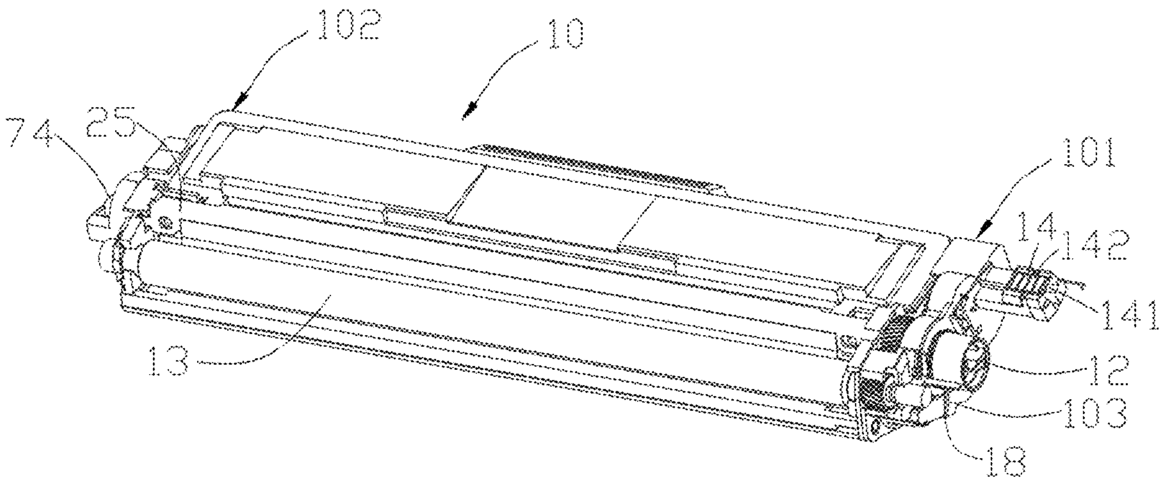
FIG. 8 is a structural view of the developing cartridge of Embodiment 1 in the present disclosure.
Figure 9:
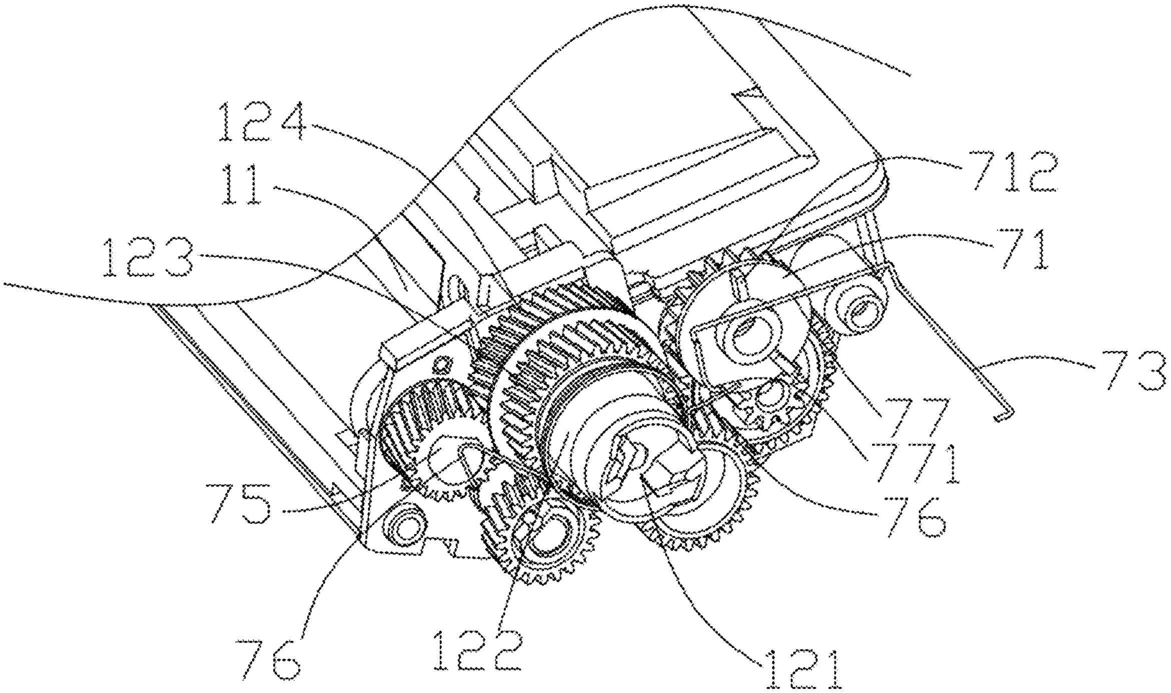
FIG. 9 is a partial structural view of one end of the developing cartridge of Embodiment 1 in the present disclosure.
Figure 10:
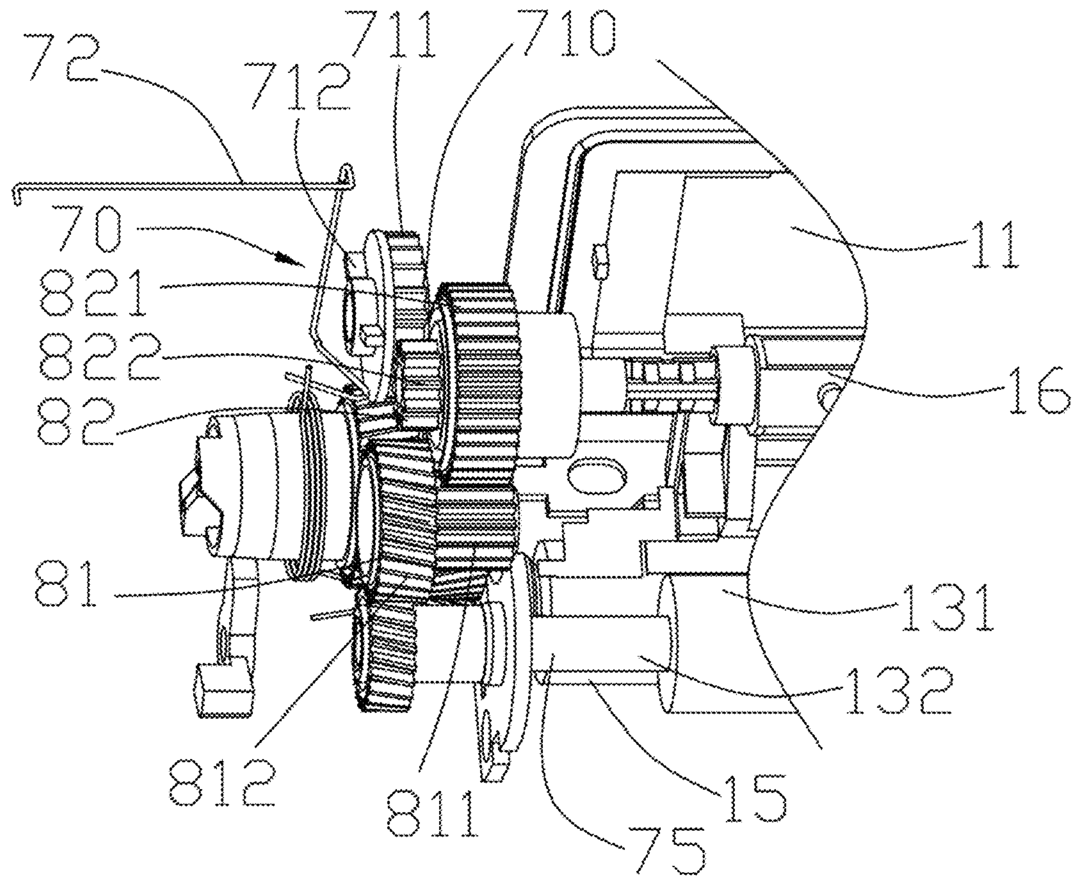
FIG. 10 is a partial structural view of the other end of the developing cartridge of Embodiment 1 in the present disclosure.
Figure 11:
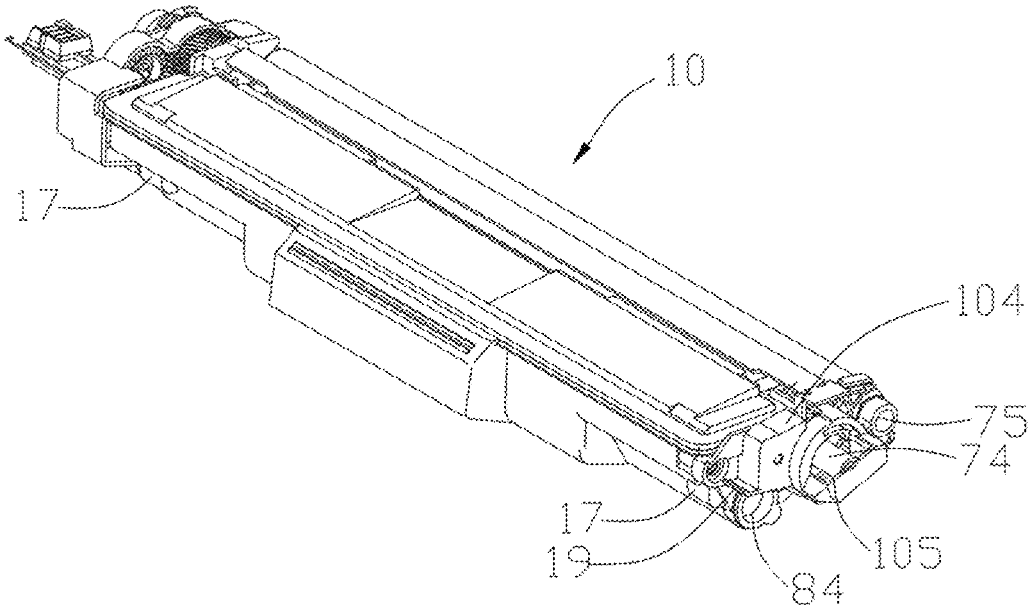
FIG. 11 is a structural view showing another angle of the developing cartridge of Embodiment 1 in the present disclosure.

As shown in FIGS. 6-8, the drum cartridge 20 comprises a drum frame 202, photosensitive drum 201, second drive force receiving member 203, charging member 204, first electrode 205, separation force transmission member 206, pressing member, and locking member 207. The drum frame 202 comprises a mounting portion for mounting the developing cartridge 10. The photosensitive drum 201 is rotatably mounted on the drum frame 202. The second drive force receiving member 203 is positioned at one side of the drum cartridge 20 to receive driving force from the imaging device P and directly or indirectly drive rotation of the photosensitive drum 201. The charging member 204 charges the photosensitive drum 201, and the first electrode 205 can receive first electrical power from the imaging device P and transmit it to the charging member 204. The separation force transmission member 206 is disposed on the drum frame 202 and can move upon receiving force from the separation force applying member to transmit separation force to the developing cartridge 10. In this embodiment, the separation force transmission member 206 is configured as a rotating member. The pressing member can apply pressing force to the developing cartridge 10 to bring the developing roller 13 mounted on the developing cartridge 10 into contact with the photosensitive drum 201. The locking member 207 locks the developing cartridge 10 in position.

As shown in FIGS. 7-11, the developing cartridge 10 comprises a developing frame 11, first drive force receiving member 12, developing roller 13, and storage unit 14. Some developing cartridges 10 may also include a supply roller 15 and/or an agitation member 16.

Along the longitudinal direction of the developing cartridge 10, the developing cartridge 10 has a first end portion 101 and an opposing second end portion 102. The developing frame 11 comprises a developer chamber for accommodating developer. The developing roller 13 comprises a developing layer 131 and a developing roller shaft 132, with the developing layer 131 wrapped around the outside of the developing roller shaft 132. Both the developing roller shaft 132 and developing layer 131 can be electrically conductive. Viewed along the installation direction of the developing cartridge 10 into the imaging device P, the developing roller 13 is rotatably mounted on the front side of the developing frame 11, exposed from the front side of the developing frame 11, and positioned to face the photosensitive drum 201 when installed in the imaging device P to perform development operations. The storage unit 14 stores information such as specifications and model of the developing cartridge 10. It comprises a substrate 141, memory, and electrical contacts. The substrate 141 has a front surface and an opposing back surface. The electrical contacts and the memory are both mounted on the substrate 141, with the electrical contacts mounted on the front surface of the substrate 141 and the memory mounted on the back surface of the substrate 141. The electrical contacts include a plurality of contacts (two or more), including at least one ground terminal 142 that can electrically connect with the imaging device P to achieve grounding. In this embodiment, the storage unit 14 is disposed at the first end portion 101 of the developing cartridge 10.

The supply roller 15 is rotatably supported on the developing frame 11 facing the developing roller 13 and can supply developer to the developing roller 13. The agitation member 16 agitates developer contained in the developer chamber. The first drive force receiving member 12 receives driving force from the imaging device P to directly or indirectly rotate the developing roller 13 and supply roller 15. Preferably, the first drive force receiving member 12 is disposed at the first end portion 101 of the developing cartridge 10.

The first drive force receiving member 12 comprises a first force receiving portion 121, second main body portion 122, first gear portion 123, and sixth gear portion 124. The first force receiving portion 121 is disposed on the second main body portion 122 and can mesh with and receive driving force from a drive force output member of the imaging device P. The first gear portion 123 and sixth gear portion 124 connect to the second main body portion 122 and can transmit the driving force. The first gear portion 123 and sixth gear portion 124 may be integrally formed with or movably connected to the second main body portion 122. Preferably, the diameter of the second main body portion 122 is smaller than that of the first gear portion 123, which is in turn smaller than that of the sixth gear portion 124. The first gear portion 123 is positioned further from the developing frame 11 compared to the sixth gear portion 124. The storage unit 14 may be disposed at the first end portion 101, second end portion 102, or at a position between the first end portion 101 and second end portion 102. In this embodiment, the developing cartridge 10 also comprises a first end cover 103 positioned at the first end portion 101 of the developing cartridge 10, connected to the developing frame 11, and at least partially covering the first drive force receiving member 12.

This embodiment of the developing cartridge 10 further comprises a pressed member 17, separation force receiving member 18, and lockable member 19. The pressed member 17 can receive force from the pressing member to bring the developing roller 13 and photosensitive drum 201 into proximity or contact. The separation force receiving member 18 receives force from the separation force transmission member 206/separation force applying member to separate the developing roller 13 from the photosensitive drum 201.

The pressed member 17 is disposed on the developing frame 11, preferably integrally formed with the developing frame 11. When the developing cartridge 10 is installed in the drum cartridge 20, the pressing member abuts against the pressed member 17 and applies force to the pressed member 17 from rear to front. More preferably, the pressed member 17 is positioned between the two end portions of the developing cartridge 10. The separation force receiving member 18 is disposed at one end of the developing cartridge 10. When the imaging device P executes a cleaning operation, the separation force transmission member 206/separation force applying member applies force to the separation force receiving member 18, causing the developing cartridge 10 to move rearward, thereby separating the developing roller 13 from the photosensitive drum 201. Preferably, the separation force receiving member 18 is disposed on and protrudes from the developing frame 11.

In some embodiments, the separation force receiving member 18 is disposed on the second main body portion 122 of the first drive force receiving member 12. The separation force receiving member 18 may be integrally formed with or separately formed from the second main body portion 122. The lockable member 19 is disposed on the rear side of the developing cartridge 10. When the developing cartridge 10 is installed in the drum cartridge 20, the lockable member 19 engages with the locking member 207 to lock the developing cartridge 10 in position. Specifically, the lockable member 19 is disposed on the second end cover 104. Preferably, the locking member 19 is positioned adjacent to the pressed member 17.

As shown in FIGS. 7-11, this embodiment of the developing cartridge 10 also comprises a detectable device 70 that can be detected by the detection device 50 of the imaging device P.

The detectable device 70 comprises a conductive assembly 72 and a first voltage control member 71. When installed in the imaging device P, the conductive assembly 72 can electrically connect with the detection device 50/switching member 503 and the grounding terminal K of the imaging device P. The first voltage control member 71 controls the making and breaking of electrical connection between the detection device 50 and grounding terminal K, thereby causing changes in voltage detected by the detection unit 501. Specifically, the conductive assembly 72 comprises a first electrical connection portion 73 for electrical contact with the grounding terminal K. The grounding terminal K may be at least one of the following elements: the ground terminal 142 of the storage unit 14, the imaging device contact pin that contacts the ground terminal 142, the inner wall of the door P2, the first upper wall P41, and the grounding conductive members P311.

In this embodiment, the first electrical connection portion 73 preferably contacts the first upper wall P41. In some embodiments, the first electrical connection portion 73 makes contact within the first gap P471 or second gap P472.

The conductive assembly 72 comprises a first conductive member 74, second conductive member 75, third conductive member 76 and fourth conductive member 77. The first conductive member 74, second conductive member 75, third conductive member 76 and fourth conductive member 77 can be electrically connected in sequence and may be separately formed or integrally formed.

In this embodiment, at least a portion of the first conductive member 74 is disposed at the second end portion 102 of the developing cartridge 10 and can receive electrical power from the imaging device P, specifically through contact with the switching member 503 of the imaging device P. The second conductive member 75 electrically connects with the first conductive member 74 and has at least a portion extending between the first end portion 101 and second end portion 102 of the developing cartridge 10. The second conductive member 75 may be at least one of the developing roller shaft 132, developing roller 13, supply roller 15, and doctor blade 25. In this embodiment, the developing roller shaft 132 serves as the second conductive member 75. The third conductive member 76 electrically connects with the second conductive member 75 and has at least a portion disposed at the first end portion 101 of the developing cartridge 10. The fourth conductive member 77 can selectively electrically connect with the third conductive member 76 and can electrically connect with the grounding terminal K, preferably connecting with the first upper wall P41. At least a portion of the fourth conductive member 77 is disposed at the first end portion 101 of the developing cartridge 10.

The conductive assembly 72 can switch internally between an electrically connected state and an electrically non-connected state. Specifically, the third conductive member 76 and fourth conductive member 77 can switch between an electrically connected state and an electrically non-connected state. At least a portion (the moving end) of the third conductive member 76 and/or fourth conductive member 77 is movable to enable switching between contact and non-contact states between the third conductive member 76 and fourth conductive member 77. Preferably, the fourth conductive member 77 comprises a first electrical connection portion 73 that contacts the grounding terminal K, with this first electrical connection portion 73 being elastically deformable. When the developing cartridge 10 is installed in the drum cartridge 20, the first electrical connection portion 73 abuts against the grounding terminal K. In some embodiments, when the developing cartridge 10 moves rearward under force from the separation force transmission member 206/separation force applying member, the first electrical connection portion 73 maintains contact with the grounding terminal K, effectively improving contact stability between the first electrical connection portion 73 and grounding terminal K. In some embodiments, when the developing cartridge 10 is not under force from the separation force transmission member 206/separation force applying member, the first electrical connection portion 73 has a first deformation amount, and when the developing cartridge moves rearward under force from the separation force transmission member 206/separation force applying member, the first electrical connection portion 73 has a second deformation amount, with the first deformation amount being greater than the second deformation amount.

Preferably, the first voltage control member 71 is configured to move between a third position and a fourth position. In the third position, the first voltage control member 71 drives the third conductive member 76 and/or fourth conductive member 77 to place the third conductive member 76 and fourth conductive member 77 in an electrically connected state. In the fourth position, the first voltage control member 71 does not drive the third conductive member 76 and/or fourth conductive member 77, leaving the third conductive member 76 and fourth conductive member 77 in an electrically non-connected state.

The first voltage control member 71 is configured to move in response to movement of the first drive force receiving member 12. It can directly or indirectly drive at least a portion of the third conductive member 76 and/or fourth conductive member 77 to enable switching between contact and non-contact states between the third conductive member 76 and fourth conductive member 77.

The first voltage control member 71 is rotatably connected directly or indirectly to the developing frame 11. In this embodiment, the first voltage control member 71 is rotatably mounted on the first end cover 103 of the developing cartridge 10, thereby not only optimizing the installation space of the first end portion 101 for the assembly of the developing cartridge 10 but also allowing the first voltage control member 71 to be installed on different developing cartridges 10 by removing and installing the first end cover 103, thereby improving the adaptability of the first voltage control member 71. Meanwhile, the first voltage control member 71 is configured as a rotary member including a first main body portion 710, first drive force receiving portion 711, and first driving portion 712. The first drive force receiving portion 711 is disposed on the first main body portion 710 for engaging with and receiving driving force from the first drive force receiving member 12. The first driving portion 712 is disposed on the first main body portion 710 and can drive the third conductive member 76 to make electrical contact between the third conductive member 76 and fourth conductive member 77.

In this embodiment, in the longitudinal direction of the developing cartridge (i.e., left-right direction), the first voltage control member 71 at least partially overlaps with the storage unit 14.

The developing cartridge 10 of this embodiment also comprises a first force applying portion 105 that can apply force to the switching member 503 of the imaging device P when the developing cartridge 10 is installed in the imaging device P, moving the switching member 503 from its initial position to a closed position. In this embodiment, the first force applying portion 105 is disposed on the first conductive member 74. Alternatively, the first force applying portion 105 may be disposed separately from the first conductive member 74.

The developing cartridge 10 of this embodiment further comprises a deceleration mechanism disposed at the first end portion 101 of the developing cartridge 10. The deceleration mechanism comprises at least a first transmission member 81 and a second transmission member 82. The first transmission member 81 comprises a third gear portion 811 and a fourth gear portion 812, with the diameter of the third gear portion 811 being smaller than that of the fourth gear portion 812. The third gear portion 811 is positioned closer to the developing frame 11 compared to the fourth gear portion 812.

The second transmission member 82 comprises a fifth gear portion 821 and a second gear portion 822. The diameter of the fifth gear portion 821 is greater than that of the second gear portion 822, with the fifth gear portion 821 being positioned closer to the developing frame 11 compared to the second gear portion 822.

The fourth gear portion 812 can mesh with the first gear portion 123 of the first drive force receiving member 12, the third gear portion 811 can mesh with the fifth gear portion 821 of the second transmission member 82, and the second gear portion 822 of the second transmission member 82 can mesh with the first drive force receiving portion 711 of the first voltage control member 71. Preferably, the diameter of the third gear portion 811 is smaller than the diameters of both the first gear portion 123 and sixth gear portion 124. Preferably, the diameter of the second gear portion 822 is smaller than that of the third gear portion 811. Preferably, the diameter of the first drive force receiving portion 711 of the first voltage control member 71 is greater than that of the second gear portion 822.

Since the diameter of the third gear portion 811 is smaller than that of the fifth gear portion 821, when the third gear portion 811 transmits driving force to the fifth gear portion 821, the rotational angular velocity of the second transmission member 82 is less than that of the first transmission member 81. Since the diameter of the second gear portion 822 is smaller than that of the first drive force receiving portion 711, when the second transmission member 82 transmits driving force to the first voltage control member 71, the rotational angular velocity of the first voltage control member 71 is less than that of the second transmission member 82. Thus, when driving force is transmitted from the first drive force receiving member 12 to the first voltage control member 71, the rotational speed is reduced, with the rotational speed of the first voltage control member 71 being less than that of the first drive force receiving member 12. This effectively controls the rotational speed of the first voltage control member 71 to enable effective control of circuit making and breaking by the first voltage control member 71 and improve detection precision.

In this embodiment, the detectable device 70 further comprises a driving force cut-off mechanism for cutting off driving force transmitted to the first voltage control member 71. Specifically, the driving force cut-off mechanism may be a first missing tooth portion disposed on the first main body portion 710 of the first voltage control member 71. When the first missing tooth portion rotates to face the second gear portion 822 of the second transmission member 82, driving force transmission is cut off, the first voltage control member 71 stops rotating, and detection is complete. In some embodiments, the first voltage control member 71 is configured to move along its rotation axis. When detection is complete, the first voltage control member 71 is configured to move along its rotation axis to disengage the second gear portion 822 of the second transmission member 82 from the first drive force receiving portion 711 of the first voltage control member 71.

This embodiment of the developing cartridge 10 also comprises a developer supply port 84 disposed at the second end portion 102 of the developing cartridge 10. The developer supply port 84 does not overlap with the second end cover 104 disposed at the second end portion 102 of the developing cartridge 10. The developer supply port 84 is disposed at the second end portion 102 of the developing cartridge 10 to facilitate developer filling. Since a plurality of transmission members are disposed at the first end portion 101 of the developing cartridge 10, placing the developer supply port 84 at the first end portion 101 would not facilitate developer filling.

Figure 13:
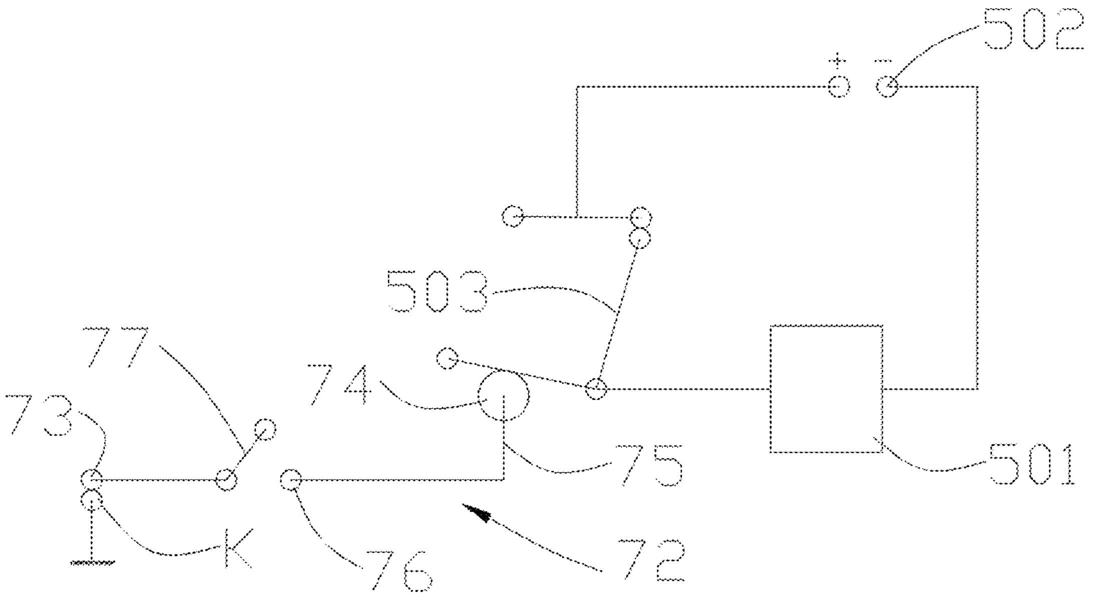
FIG. 13 is a schematic diagram showing the circuit formed between the detection device and detectable device when the developing cartridge of Embodiment 1 is installed in the imaging device in the present disclosure.

When the developing cartridge 10 is installed in the imaging device P, the first conductive member 74/first force applying portion 105 abuts against the switching member 503 of the imaging device P, moving the switching member 503 from its initial position to the closed position (as shown in FIG. 13). The first conductive member 74 electrically connects with the switching member 503, the fourth conductive member 77 electrically connects with the grounding terminal K, and the third conductive member 76 and fourth conductive member 77 are not in contact. At this time, the detection unit 501 detects a voltage value of U1.

Figure 12:
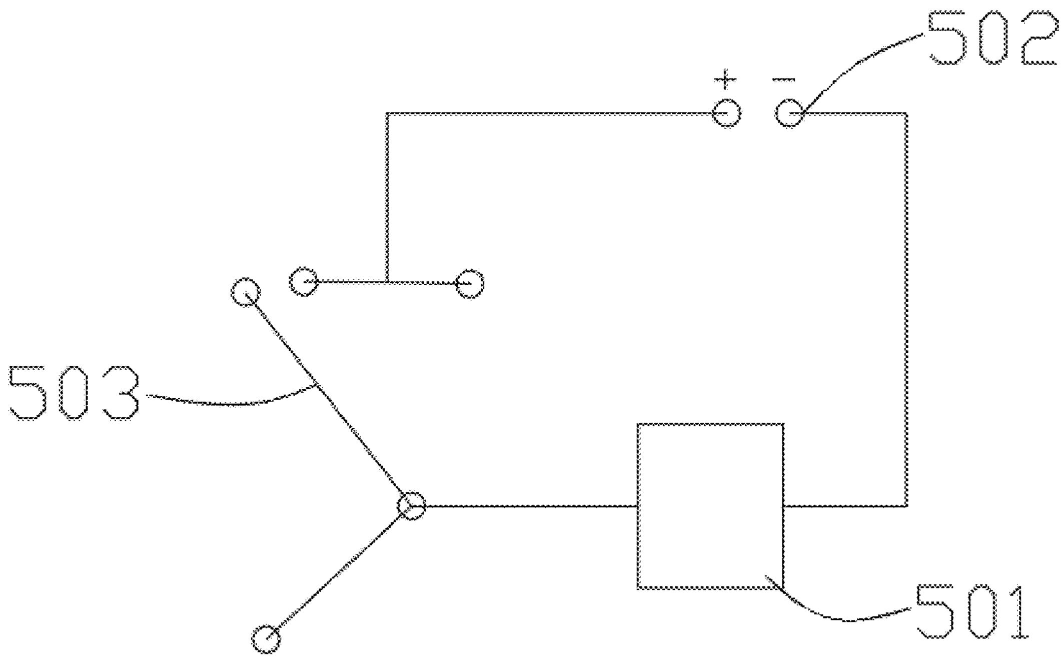
FIG. 12 is a schematic diagram showing the internal circuit of the detection device when the developing cartridge of Embodiment 1 is not installed in the imaging device in the present disclosure.
Figure 14:
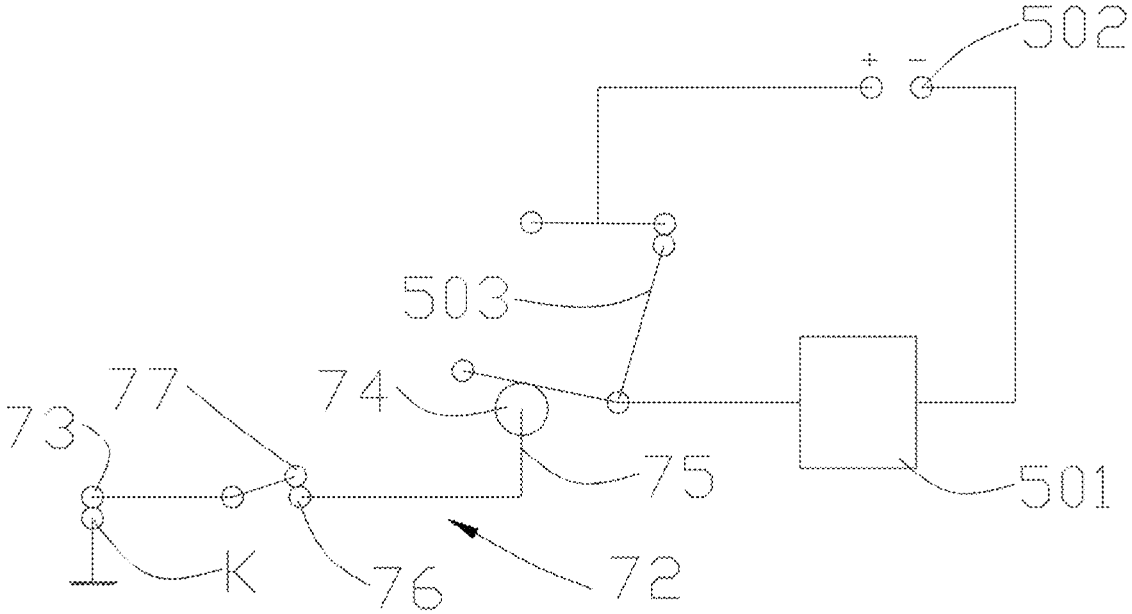
FIG. 14 is a schematic diagram showing the circuit when the detection device and grounding terminal are conducting while the developing cartridge of Embodiment 1 is installed in the imaging device in the present disclosure.

The detection process for the developing cartridge is described with reference to FIGS. 12-14.

When detection of the developing cartridge 10 begins, the first drive force receiving member 12 receives driving force and rotates, causing the first voltage control member 71 to receive driving force and rotate. As the first voltage control member 71 rotates, the first driving portion 712 drives the first force receiving portion 771 of the fourth conductive member 77 to make electrical contact with the third conductive member 76, at which point the voltage value of the detection device 50 becomes U2. The values of U2 and U1 are different, and the detection unit 501 detects and records this voltage change.

In this embodiment, the first voltage control member 71 comprises a plurality of first driving portions 712, allowing the third conductive member 76 and fourth conductive member 77 to switch multiple times between electrically connected and non-connected states. The detection unit 501 detects multiple voltage value changes to identify information such as the capacity and specifications of the developing cartridge 10. When detection is complete, driving force to the first voltage control member 71 is cut off, it no longer receives driving force, the first driving portion 712 no longer applies force to the fourth conductive member 77, and the third conductive member 76 and fourth conductive member 77 remain in an electrically non-connected state. The absolute value of U1 is greater than the absolute value of U2, with U2 preferably being 0.

In some embodiments, impedance elements may be included in the conductive assembly.

In some embodiments, the first conductive member 74 and second conductive member 75 may be metal wires, metal conductive plates, conductive rubber, conductive resin, or similar materials.

In some embodiments, driving force may be transmitted to the first voltage control member 71 by utilizing a torsion spring or spring that has accumulated elastic potential energy without needing to receive driving force from the first drive force receiving member 12.

In some embodiments, driving force may be transmitted to the first voltage control member 71 through the second drive force receiving member 203 disposed in the drum cartridge.

In some embodiments, the second conductive member may be an independently disposed conductive member.

The developing cartridge 10 having the above structure provides a novel detection structure with improved detection precision and simplified construction.

The developing cartridge 10 having the above structure eliminates the need for mechanisms to strike the switching member/swing arm, reducing damage to the swing arm. It also reduces vibration from striking actions, reducing noise and improving user experience.

Embodiment 2

This embodiment represents an advancement based on Embodiment 1. Common elements between the embodiments will not be repeated; only the substantive differences will be described. The specification drawings from the previous embodiment may be referenced for identical components.

Figure 15:
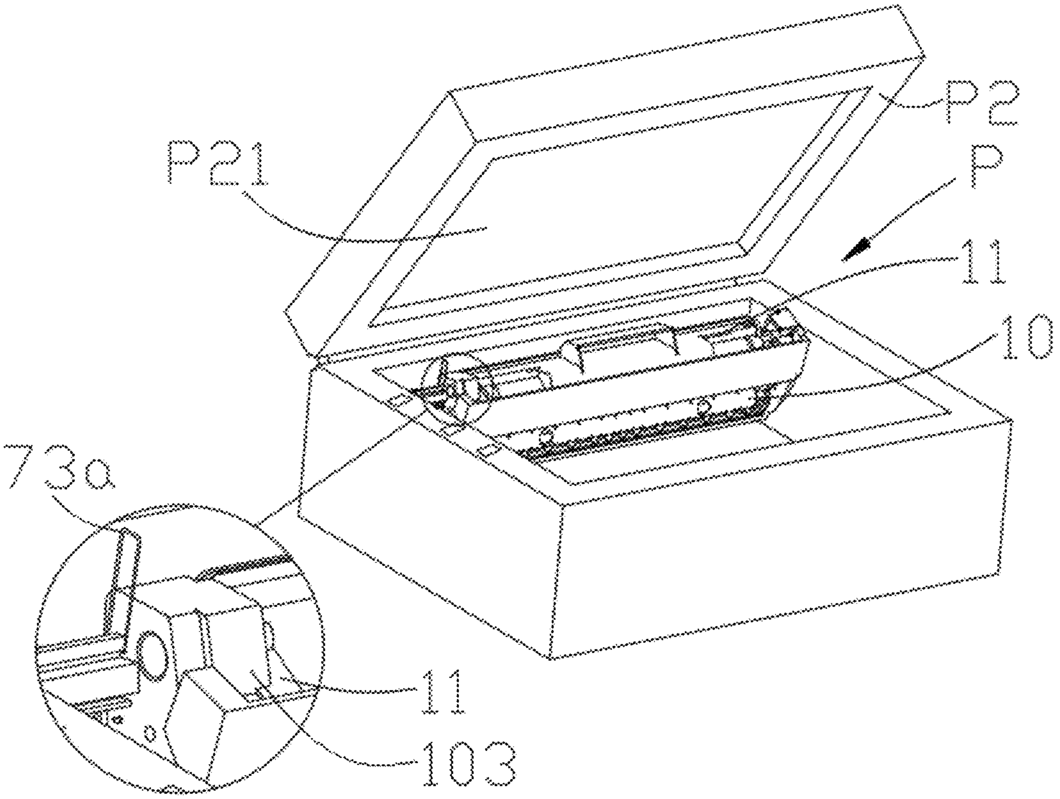
FIG. 15 is a structural view showing the developing cartridge of Embodiment 2 installed in the imaging device in the present disclosure.

As illustrated in FIG. 15, the conductive assembly of the developing cartridge 10 in this embodiment is configured to establish electrical connection with the first inner wall P21 of the door P2 of the imaging device P. Specifically, the first electrical connection portion 73*a* extends from the rear end of the developing cartridge 10. When the door P2 is in its closed position, the first inner wall P21 of the door P2 establishes electrical connection with the first electrical connection portion 73*a*. In this particular embodiment, the first electrical connection portion 73*a* extends outward from the first end cover 103.

The first electrical connection portion 73*a* is preferably configured to be elastically deformable, enhancing the stability of the contact with the door P2.

In certain embodiments, the first electrical connection portion 73*a* is configured to be movable relative to the developing frame 11, thereby preventing any potential interference with the door P2.

The imaging device P may, in some embodiments, be configured to accommodate multiple developing cartridges, with each cartridge incorporating at least one first electrical connection portion 73*a*. These multiple first electrical connection portions 73*a* are designed with varying protrusion lengths from their respective developing frames.

This structural configuration of the developing cartridge 10 achieves enhanced contact stability with the door P2. Moreover, compared to configurations where the first electrical connection portion 73*a* contacts the first upper wall P41, this design eliminates potential contact reliability issues that might arise from contact with labels P47.

The grounding terminal K may be at least one of the following elements: the ground terminal 142 of the storage unit 14, the imaging device contact pin that contacts the ground terminal 142, the inner wall of the door P2, the first upper wall P41, and the grounding conductive members P311.

Embodiment 3

This embodiment represents a further advancement based on either Embodiment 1 or 2. Common elements shared among the embodiments will not be repeated; only the substantive differences will be detailed. The specification drawings from previous embodiments may be referenced for identical components.

Figure 16:
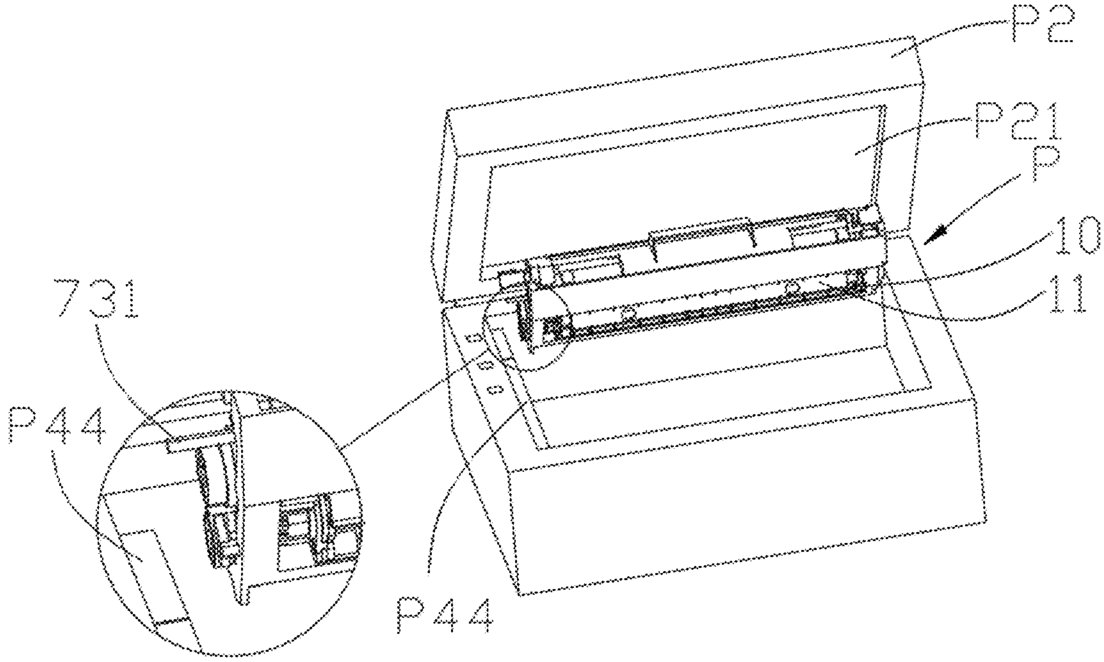
FIG. 16 is a structural view showing the developing cartridge of Embodiment 3 before installation in the imaging device in the present disclosure.
Figure 17:
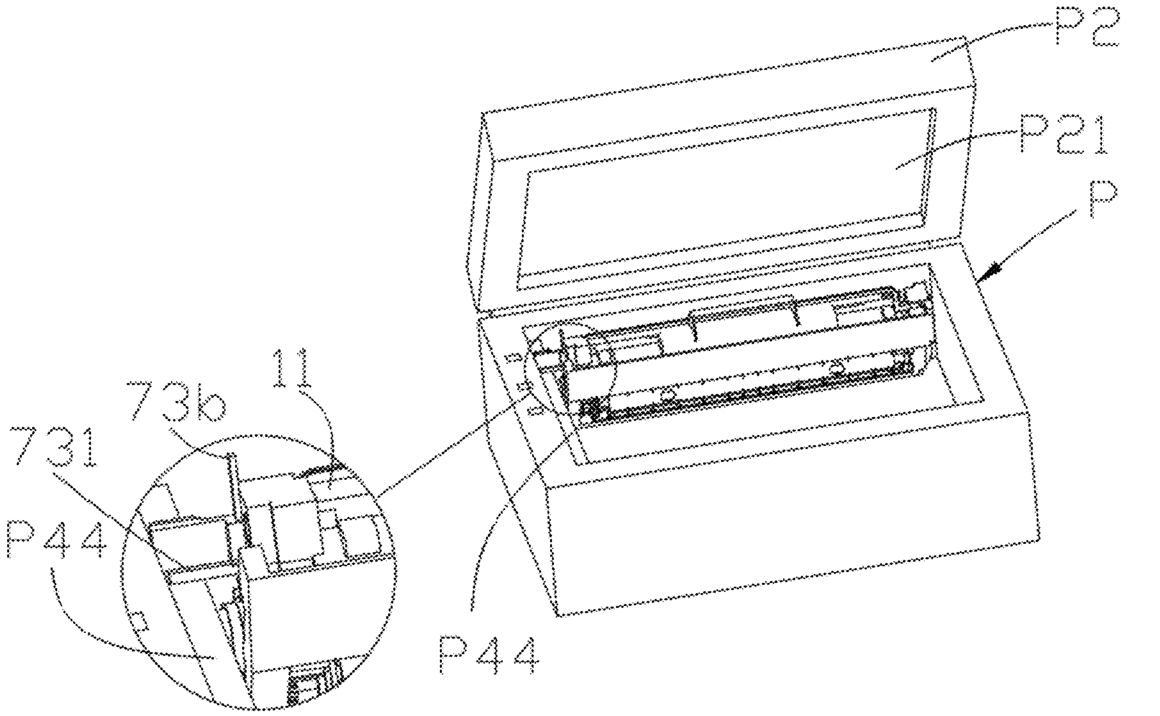
FIG. 17 is a structural view showing the developing cartridge of Embodiment 3 installed in the imaging device in the present disclosure.
Figure 18:
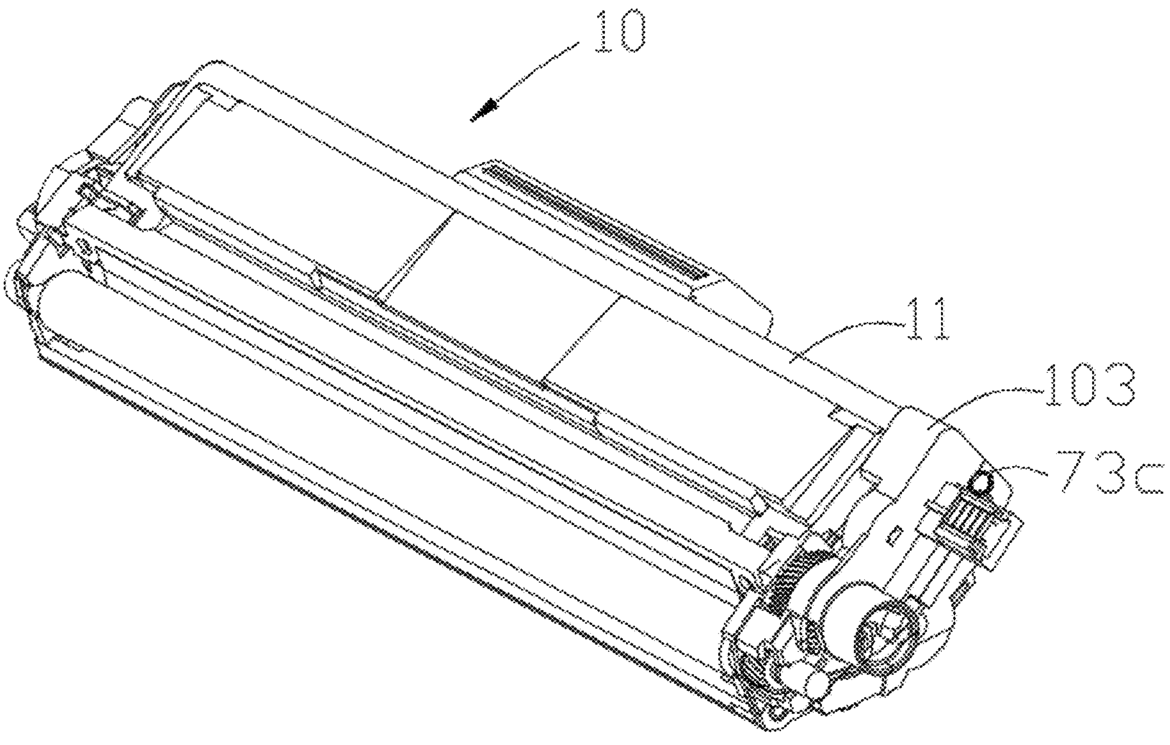
FIG. 18 is a structural view of the developing cartridge of Embodiment 4 in the present disclosure.
Figure 19:
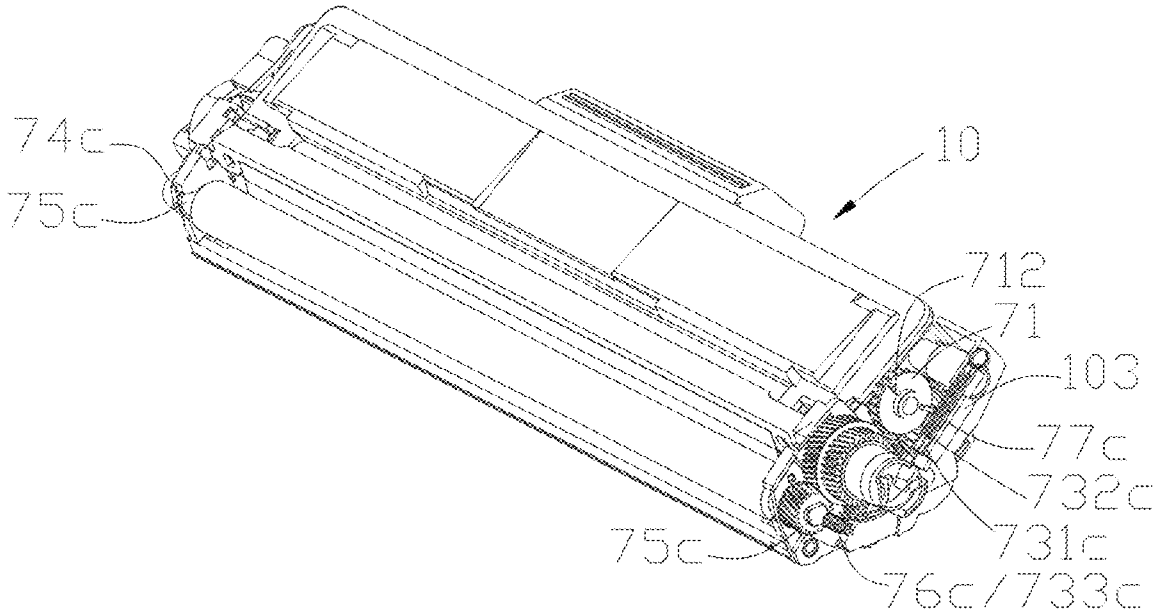
FIG. 19 is a schematic view of the developing cartridge of Embodiment 4 with certain structures hidden in the present disclosure.

As shown in FIGS. 16 and 17, the first electrical connection portion 73*b* is configured to move between a first position and a second position under external force application. In the first position, the first electrical connection portion 73*b* protrudes relative to the developing frame 11 and can establish electrical connection with the grounding terminal K. In the second position, the first electrical connection portion 73*b* retracts relative to the first position, preferably retracting relative to the developing frame 11. The movement of the first electrical connection portion 73*b* may comprise sliding, pivoting, or rotating motion.

In this embodiment, the first electrical connection portion 73*b* additionally comprises a second force receiving portion 731 capable of receiving an actuating force from the imaging device P to initiate movement, specifically receiving an actuating force from the second surface P44.

The first electrical connection portion 73*b* is preferably configured to move in the front-rear direction of the developing cartridge 10. As illustrated in FIGS. 16 and 17, when the developing cartridge 10 is not installed in the imaging device P, the first electrical connection portion 73*b* occupies the first position and does not protrude beyond the rear end of the developing cartridge 10. As shown in FIG. 17, upon installation of the developing cartridge 10 in the imaging device P, the first electrical connection portion 73*b* abuts against the second surface P44 of the second upper wall P42 of the imaging device P, causing a portion of the first electrical connection portion 73*b* to protrude beyond the rear end of the developing cartridge 10. When the door P2 is subsequently closed, the first electrical connection portion 73*b* can establish electrical connection with the first inner wall P21 of the door P2 to achieve grounding.

This structural configuration of the developing cartridge 10 allows the first electrical connection portion 73*b* to retract within the developing frame 11 during packaging operations, preventing potential damage during packaging and transportation processes.

In certain embodiments, the second force receiving portion 731 may be configured to be directly or indirectly driven by the first drive force receiving member 12, enabling movement of the first electrical connection portion 73*b* between the first position and second position.

The grounding terminal K may be at least one of the following elements: the ground terminal 142 of the storage unit 14, the imaging device contact pin that contacts the ground terminal 142, the inner wall of the door P2, the first upper wall P41, and the grounding conductive members P311.

Embodiment 4

This embodiment represents a further advancement based on Embodiments 1, 2, or 3. Common elements will not be repeated; only the substantive differences will be detailed. The specification drawings from previous embodiments may be referenced for identical components.

As shown in FIGS. 18-22, in this embodiment, the first voltage control member 71 governs the selective contact between the conductive assembly 72*c* and the grounding terminal K. Specifically, the first electrical connection portion 73*c* of the conductive assembly 72*c* can transition between states of electrical contact and non-contact with the grounding terminal.

The conductive assembly 72*c* in this embodiment comprises first conductive member 74*c*, second conductive member 75*c*, third conductive member 76*c*, and fourth conductive member 77*c*. The first conductive member 74*c* maintains electrical connection with the second conductive member 75*c* and can establish electrical connection with switching member 503 upon installation in the imaging device P. The second conductive member 75*c* extends from the first end portion 101 to the second end portion 102 of the developing cartridge 10, maintaining electrical connection with the third conductive member 76*c*. The third conductive member 76*c* establishes electrical connection with the fourth conductive member 77*c*, which in turn can connect with the grounding terminal K. Preferably, the third conductive member 76*c* and fourth conductive member 77*c* are either integrally formed or fixedly connected.

The first electrical connection portion 73*c* of the fourth conductive member 77*c* is configured for movement between the first position and second position. In the first position, the first electrical connection portion 73*c* protrudes relative to the developing frame 11 or first end cover 103, enabling electrical connection with the grounding terminal. In the second position, the first electrical connection portion 73*c* retracts relative to the first position, preferably retracting relative to the developing frame 11. The movement of the first electrical connection portion 73*c* may comprise sliding, pivoting, or rotating motion. In this embodiment, the first electrical connection portion 73*c* is slidably mounted on the first end portion 101/first end cover 103, with the first end cover 103 incorporating a receiving cavity 731*c* that accommodates at least a portion of the first electrical connection portion 73*c*. The first electrical connection portion 73*c* comprises a third force receiving portion 732*c*. During rotation of the first voltage control member 71, the first driving portion 712 can apply force to the third force receiving portion 732*c* of the first electrical connection portion 73*c*, causing movement of the first electrical connection portion 73*c* from the second position to the first position to establish electrical connection with the grounding terminal K. Preferably, the first electrical connection portion 73*c* is configured for movement in the front-rear direction of the developing cartridge 10.

The detectable device further comprises a first reset member 733*c* configured to urge the first electrical connection portion 73*c* to move from the first position to the second position. For example, when the first driving portion 712 ceases applying force to the force receiving portion of the first electrical connection portion 73*c*, the first electrical connection portion 73*c* moves from the first position to the second position under the force of the first reset member 733*c*. Preferably, the third conductive member 76*c* serves as the first reset member 733*c*, configured with a torsion spring structure. It accumulates elastic potential energy when the first electrical connection portion 73*c* moves from the second position to the first position. When the first driving portion 712 no longer applies force to the force receiving portion of the first electrical connection portion 73*c*, the third conductive member 76*c* releases this stored elastic potential energy, enabling the first electrical connection portion 73*c* to move from the first position to the second position.

Figure 20:
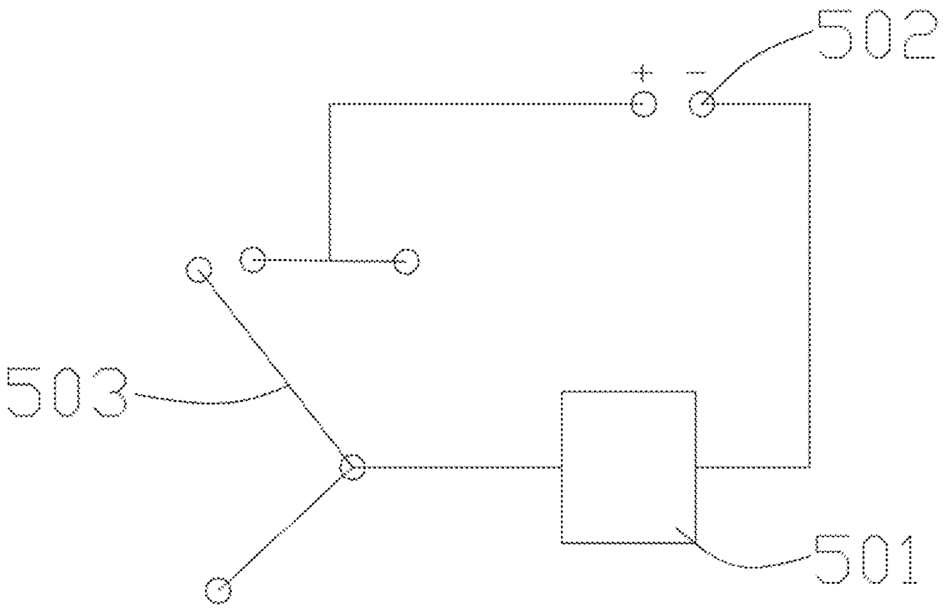
FIG. 20 is a schematic diagram showing the internal circuit of the detection device when the developing cartridge of Embodiment 4 is not installed in the imaging device in the present disclosure.
Figure 21:
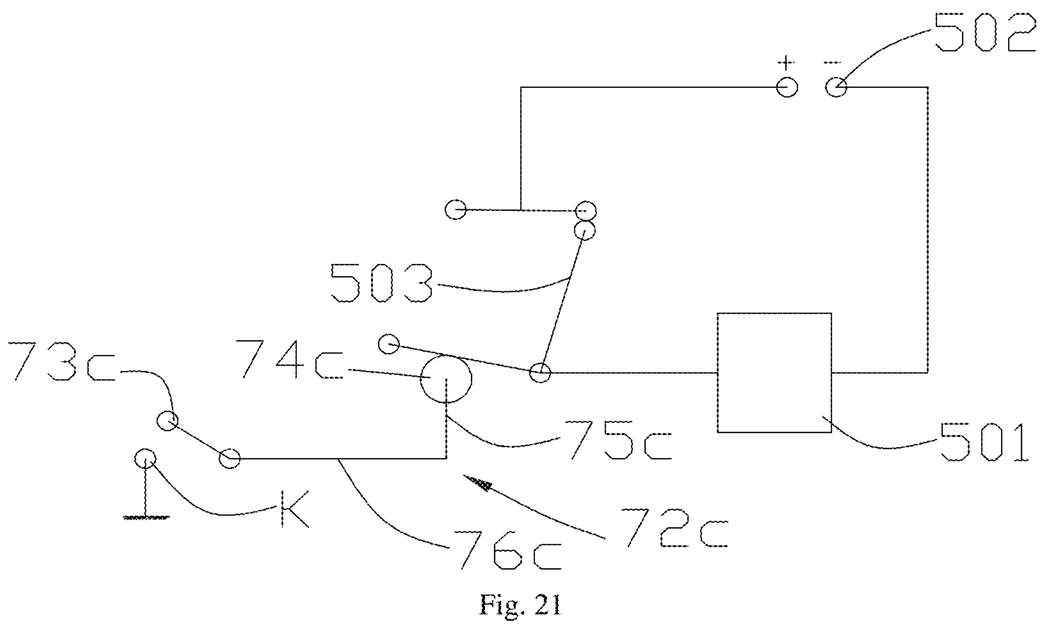
FIG. 21 is a schematic diagram showing the circuit formed between the detection device and detectable device when the developing cartridge of Embodiment 4 is installed in the imaging device in the present disclosure.
Figure 22:
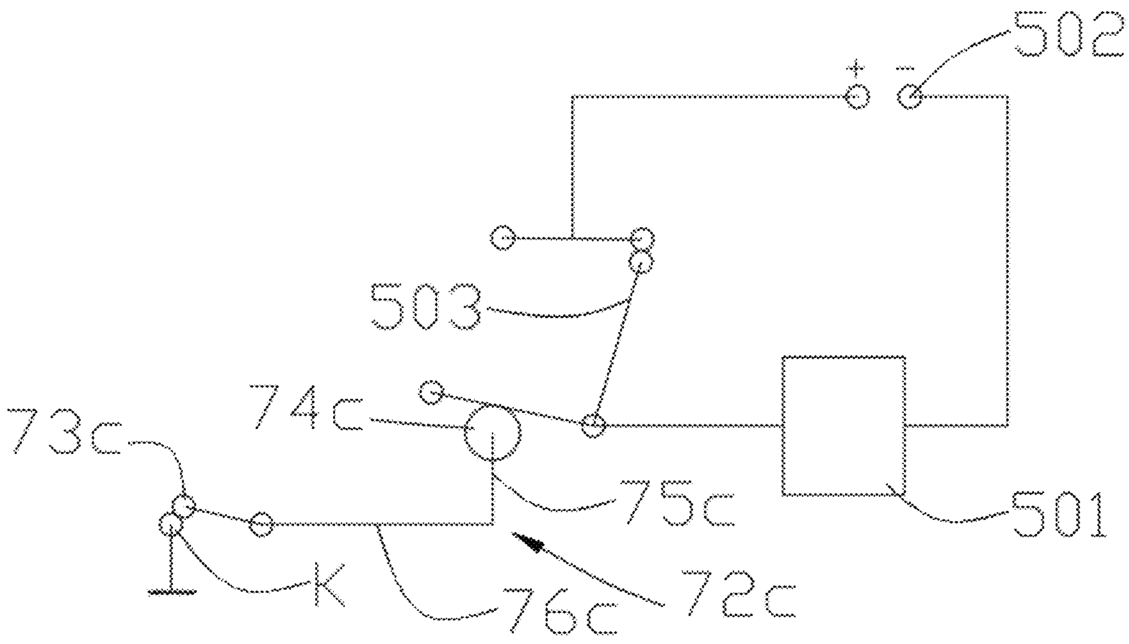
FIG. 22 is a schematic diagram showing the circuit when the detection device and grounding terminal are conducting while the developing cartridge of Embodiment 4 is installed in the imaging device in the present disclosure.
Figure 23:
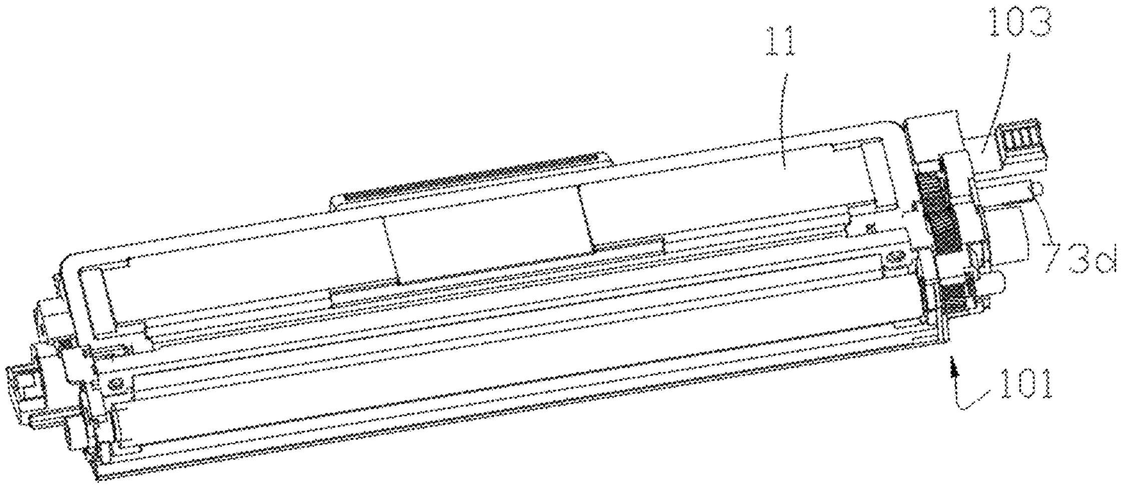
FIG. 23 is a structural view of the developing cartridge of Embodiment 5 in the present disclosure.
Figure 24:
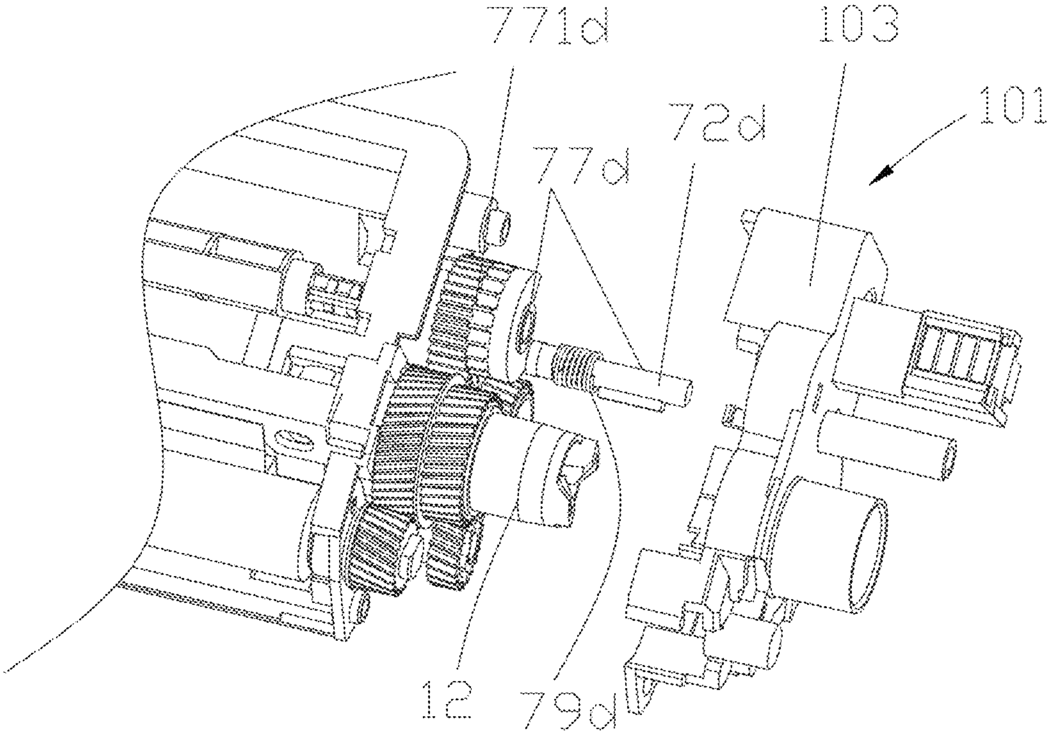
FIG. 24 is a partial structural view of one end of the developing cartridge of Embodiment 5 in the present disclosure.
Figure 25:
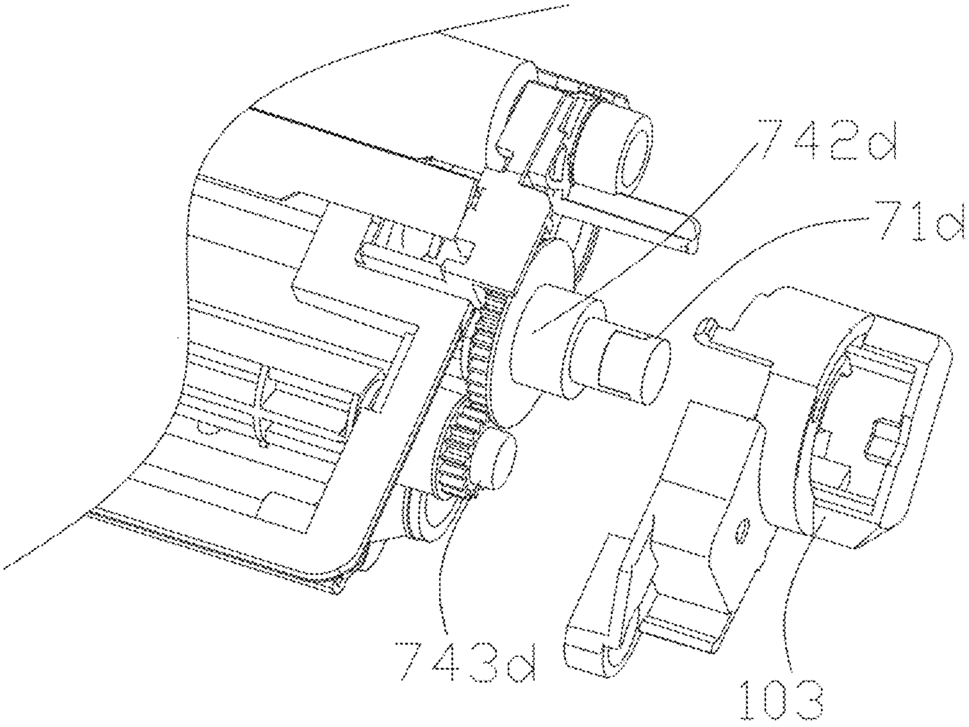
FIG. 25 is a partial structural view of the other end of the developing cartridge of Embodiment 5 in the present disclosure.
Figure 26:
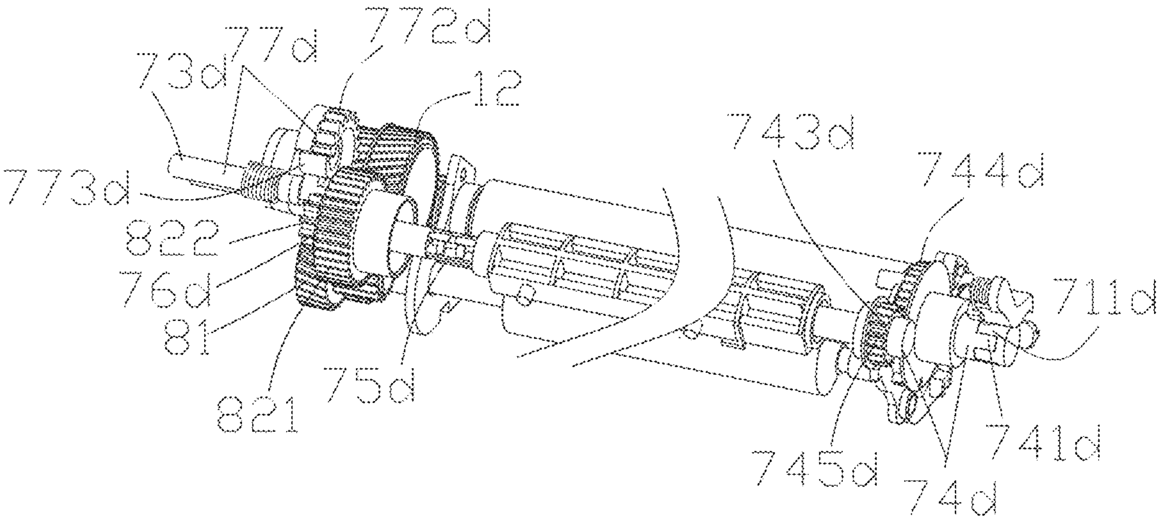
FIG. 26 is a structural view of the developing cartridge of Embodiment 5 with certain structures hidden in the present disclosure.

Referring to FIGS. 20-22, when the developing cartridge 10 has not been installed in the imaging device P, as shown in FIG. 20, the switching member 503 remains in its non-conducting open position. Upon installation of the developing cartridge 10 in the imaging device P, the swing arm 504 receives force from the first force applying portion 105, causing the switching member 503 to transition from its open position to the closed position. At this point, while the detectable device is not conducting with the grounding terminal K, the detection unit 501 registers a voltage value of U1.

When the developing cartridge 10 initiates its detection sequence, as illustrated in FIG. 22, the first driving portion 712 actuates the first electrical connection portion 73*c* to move from the second position to the first position. The first electrical connection portion 73*c* establishes contact with the grounding terminal, at which point the detection unit 501 registers a voltage value of U2. When the first driving portion 712 ceases to drive the first electrical connection portion 73*c*, the first electrical connection portion 73*c* returns from the first position to the second position due to the action of the first reset member 733*c*, breaking contact of the first electrical connection portion 73*c* with the grounding terminal K. The detection unit 501 then registers a voltage value of U1. The values U1 and U2 are distinct, enabling the detection unit 501 to detect these voltage signal variations and thereby determine information about the developing cartridge 10.

The developing cartridge 10 with this structural configuration achieves more stable electrical connections of the detectable assembly.

The grounding terminal K may be at least one of the following elements: the ground terminal 142 of the storage unit 14, the imaging device contact pin that contacts the ground terminal 142, the inner wall of the door P2, the first upper wall P41, and the grounding conductive members P311.

Embodiment 5

This embodiment represents a further advancement based on Embodiments 1, 2, 3, or 4. Common elements will not be repeated; only the substantive differences will be detailed. The specification drawings from previous embodiments may be referenced for identical components.

As illustrated in FIGS. 23-29, in this embodiment, the first voltage control member 71*d* controls selective contact between the conductive assembly 72*d* and the switching member 503. Specifically, the first conductive member 74*d* can transition between states of electrical contact and non-contact with the grounding terminal K.

In this embodiment, the first conductive member 74*d* comprises an electrical contact portion 741*d* capable of establishing electrical contact with the switching member 503. In this embodiment, the first conductive member 74*d* comprises separately formed third sub-member 742*d* and second sub-member 743*d*. The third sub-member 742*d* comprises a third sub-gear portion 744*d* and the electrical contact portion 741*d*, while the second sub-member 743*d* comprises a second sub-gear portion 745*d*. The third sub-gear portion 744*d* meshes with the second sub-gear portion 745*d*, with both the third sub-member 742*d* and second sub-member 743*d* being fabricated from conductive materials.

The second conductive member 75*d* establishes electrical connection with the first conductive member 74*d*, specifically connecting with the second sub-member 743*d*. Preferably, the second conductive member 75*d* is configured as an agitation member shaft.

The third conductive member 76*d* maintains electrical connection with the second conductive member 75*d*. Specifically, in this embodiment, the third conductive member 76*d* is replaced by the electrically conductive second transmission member 82. The third conductive member 76*d* incorporates a fifth gear portion 821 and a second gear portion 822, with the fifth gear portion 821 receiving driving force from the first drive force receiving member 12/first transmission member 81, and the second gear portion 822 transmitting this driving force onward. The fourth conductive member 77*d* establishes electrical connection with the third conductive member 76*d*. Specifically, the fourth conductive member 77*d* comprises a first sub-member 771*d* and first electrical connection portion 73*d*. In this embodiment, the first sub-member 771*d* incorporates a first sub-gear portion 772*d* and a notched portion 773*d*, with the first sub-gear portion 772*d* meshing with the second gear portion 822 to receive driving force. The first electrical connection portion 73*d* is configured to move between the first position and second position. In the first position, the first electrical connection portion 73*d* can establish electrical connection with the grounding terminal K, while in the second position, the first electrical connection portion 73*d* cannot establish such connection with the grounding terminal K.

In this embodiment, the first electrical connection portion 73*d* is configured for translational motion between the first and second positions. The first electrical connection portion 73*d* is configured as a rod member, with one end abutting against the end face of the first sub-member 771*d* and the other end configured for contact with the grounding terminal K. The first electrical connection portion 73*d* is slidably mounted on the first end cover 103 in this embodiment.

The detectable device further comprises a first elastic member 79*d* that ensures the first electrical connection portion 73*d* abuts against the end face of the first sub-member 771*d*. One end of the first elastic member 79*d* connects to the first electrical connection portion 73*d*, while the other end abuts against the first end cover 103. When the first electrical connection portion 73*d* enters the notched portion 773*d*, the force from the first elastic member 79*d* enables movement of the first electrical connection portion 73*d* from the first position to the second position. In the first position, the first electrical connection portion 73*d* can contact the grounding terminal K, while in the second position, it retracts and breaks contact with the grounding terminal K.

The first voltage control member 71*d* is disposed at the second end portion 102 of the developing cartridge 10. It comprises a non-electrical contact portion 711*d* positioned between adjacent electrical contact portions 741*d* of the first conductive member 74*d*, creating an alternating arrangement of electrical contact portions 741*d* and non-electrical contact portions 711*d*. When the switching member 503 makes contact with an electrical contact portion 741*d*, the conductive assembly 72*d* establishes electrical connection with the switching member 503. When the switching member 503 makes contact with a non-electrical contact portion 711*d*, the conductive assembly 72*d* breaks electrical connection with the switching member 503. The design may incorporate multiple electrical contact portions 741*d* and non-electrical contact portions 711*d* arranged in an alternating sequence.

Figure 27:
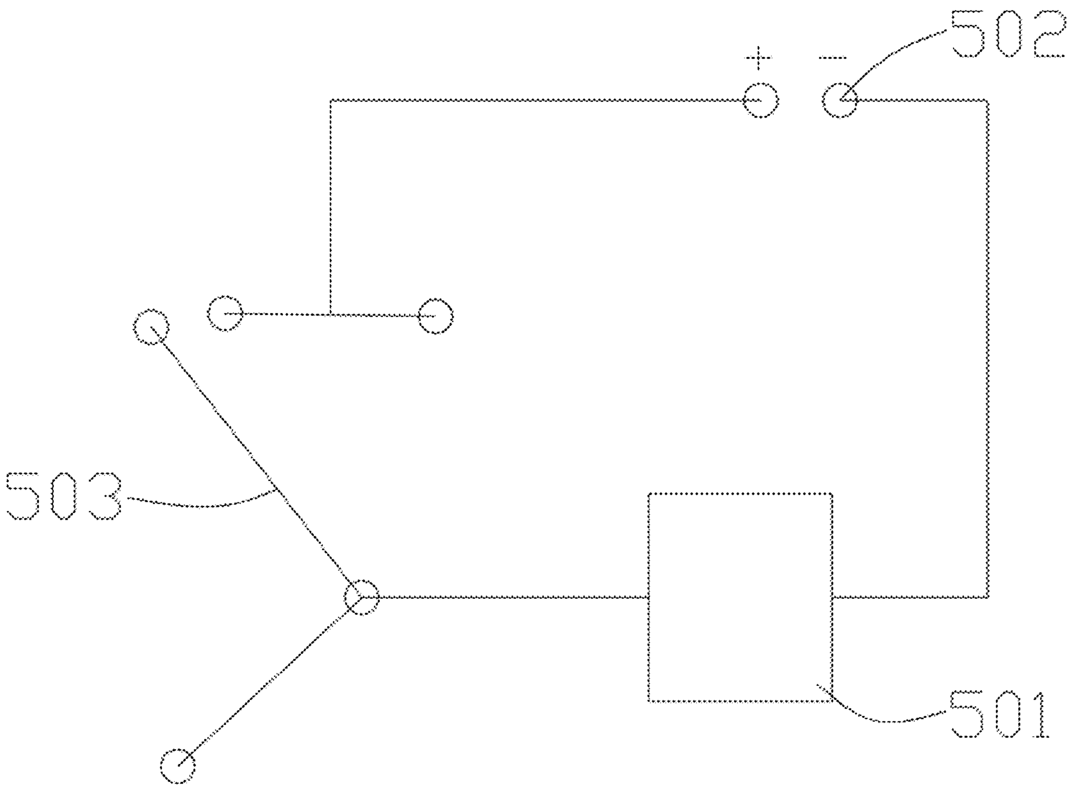
FIG. 27 is a schematic diagram showing the internal circuit of the detection device when the developing cartridge of Embodiment 5 is not installed in the imaging device in the present disclosure.
Figure 28:
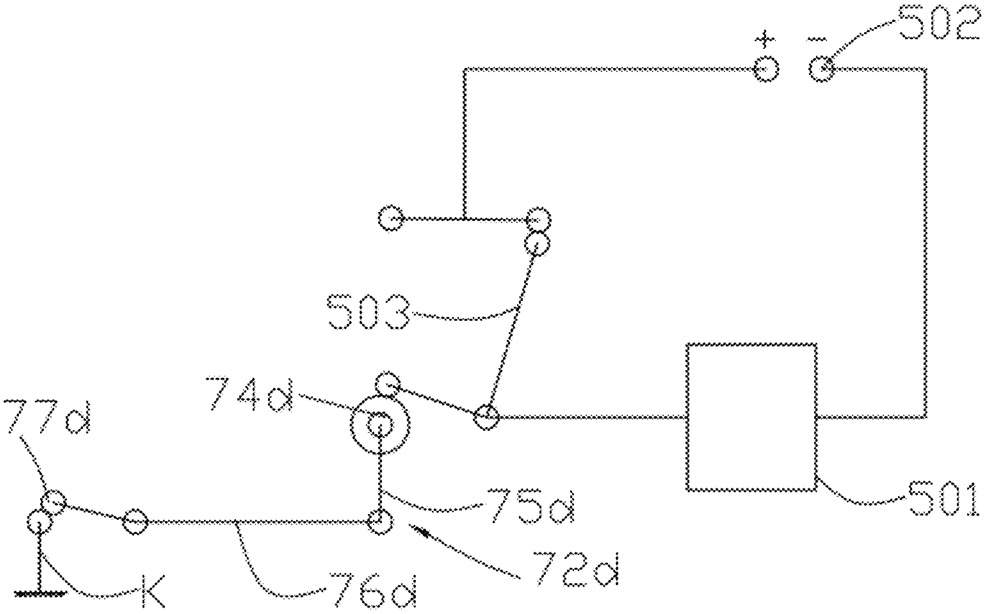
FIG. 28 is a schematic diagram showing the circuit formed between the detection device and detectable device when the developing cartridge of Embodiment 5 is installed in the imaging device in the present disclosure.
Figure 29:
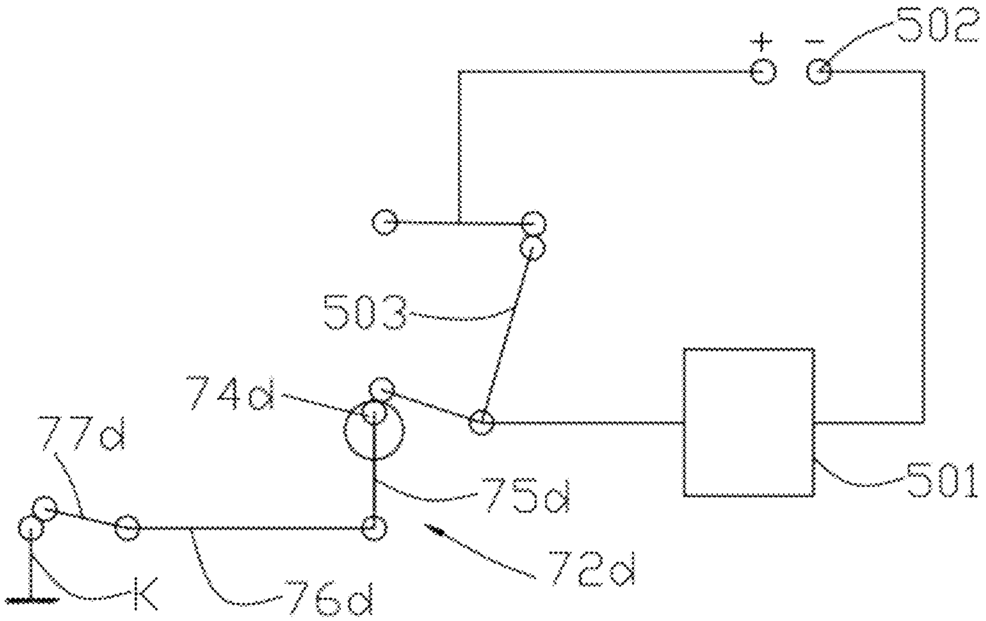
FIG. 29 is a schematic diagram showing the circuit when the detection device and grounding terminal are conducting while the developing cartridge of Embodiment 5 is installed in the imaging device in the present disclosure.

Referring to FIGS. 27-29, when the developing cartridge 10 is not installed in the imaging device P, as shown in FIG. 27, the switching member 503 remains in its non-conducting open position. Upon installation of the developing cartridge 10 in the imaging device P, the swing arm receives force from the first force applying portion 105, causing the switching member 503 to move from its open position to the closed position. At this point, the first electrical connection portion 73*d* is in the first position maintaining electrical contact with the grounding terminal K, while the switching member 503 contacts the non-electrical contact portion 711*d* of the first voltage control member 71*d* (with the first voltage control member 71*d* in its third position). The conductive assembly 72*d* remains in a state of non-electrical connection with the switching member 503, and the detection unit 501 registers a voltage value of U1.

When detection of the developing cartridge 10 begins, as shown in FIG. 29, the first drive force receiving member 12 receives and transmits driving force to the first conductive member 74*d*. As the first conductive member 74*d* and first voltage control member 71*d* rotate, the electrical contact portion 741*d* of the first conductive member 74*d* contacts the switching member 503 (with the first voltage control member 71*d* now in the fourth position). The conductive assembly 72*d* establishes conduction with the switching member 503, the detection device is grounded, and the detection unit 501 registers a voltage value of U2. As rotation of the first conductive member 74*d* and first voltage control member 71*d* continues and the non-electrical contact portion 711*d* again contacts the switching member 503, the conductive assembly 72*d* breaks electrical connection with the detection device, and the detection unit 501 returns to registering a voltage value of U1. Similarly, the electrical contact portion 741*d* and non-electrical contact portion 711*d* alternately make electrical contact with the switching member 503, enabling the detection unit 501 to detect the alternating changes in voltage and thereby determine information about the developing cartridge 10.

The developing cartridge 10 with this structural configuration achieves more stable electrical connections of the detectable assembly.

The grounding terminal K may be at least one of the following elements: the ground terminal 142 of the storage unit 14, the imaging device contact pin that contacts the ground terminal 142, the inner wall of the door P2, the first upper wall P41, and the grounding conductive members P311.

Embodiment 6

This embodiment represents an advancement based on Embodiments 1-5. Common elements between the embodiments will not be repeated; only the substantive differences will be described. The specification drawings from previous embodiments may be referenced for identical components.

Figure 30:
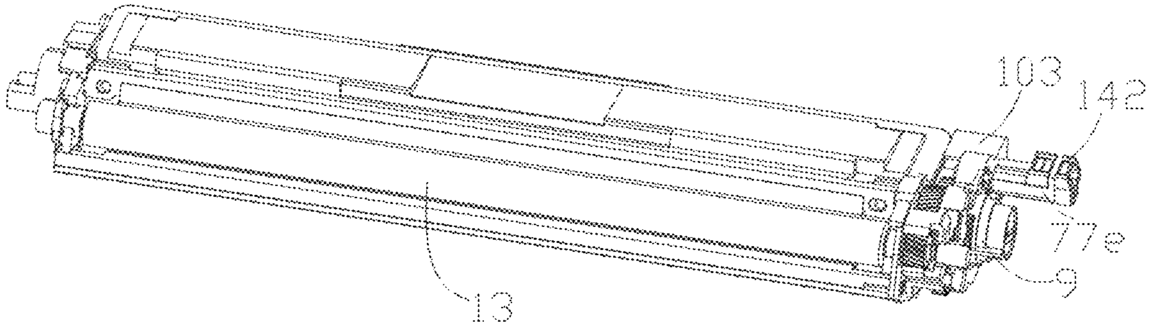
FIG. 30 is a structural view of the developing cartridge of Embodiment 6 in the present disclosure.
Figure 31:
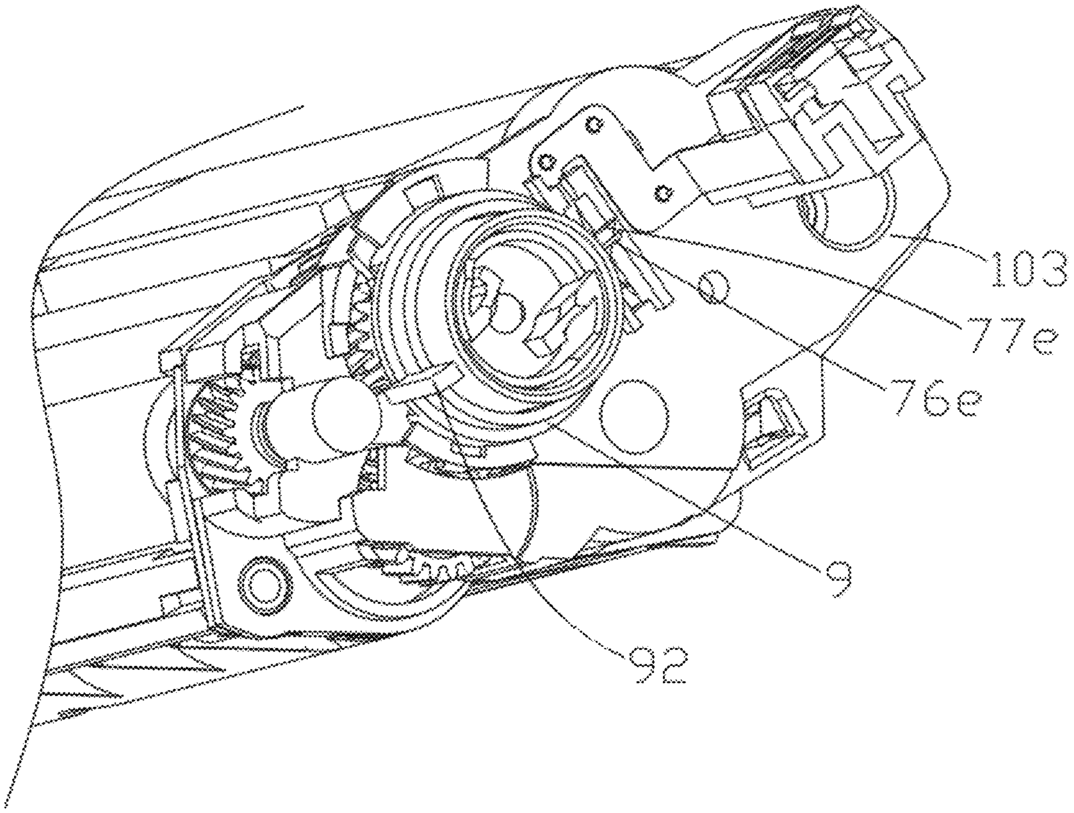
FIG. 31 is a structural view showing another angle of the developing cartridge of Embodiment 6 in the present disclosure.
Figure 32:
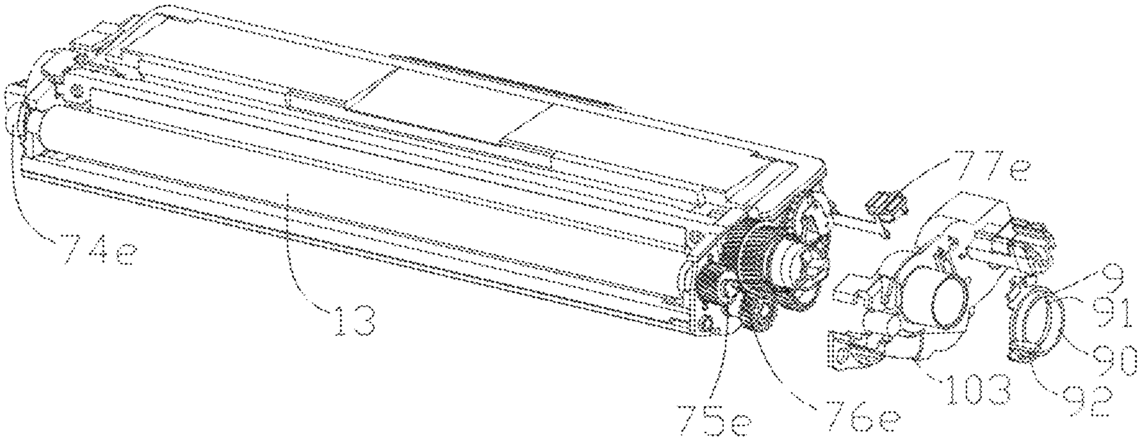
FIG. 32 is an exploded partial structural view of the developing cartridge of Embodiment 6 in the present disclosure.
Figure 33:
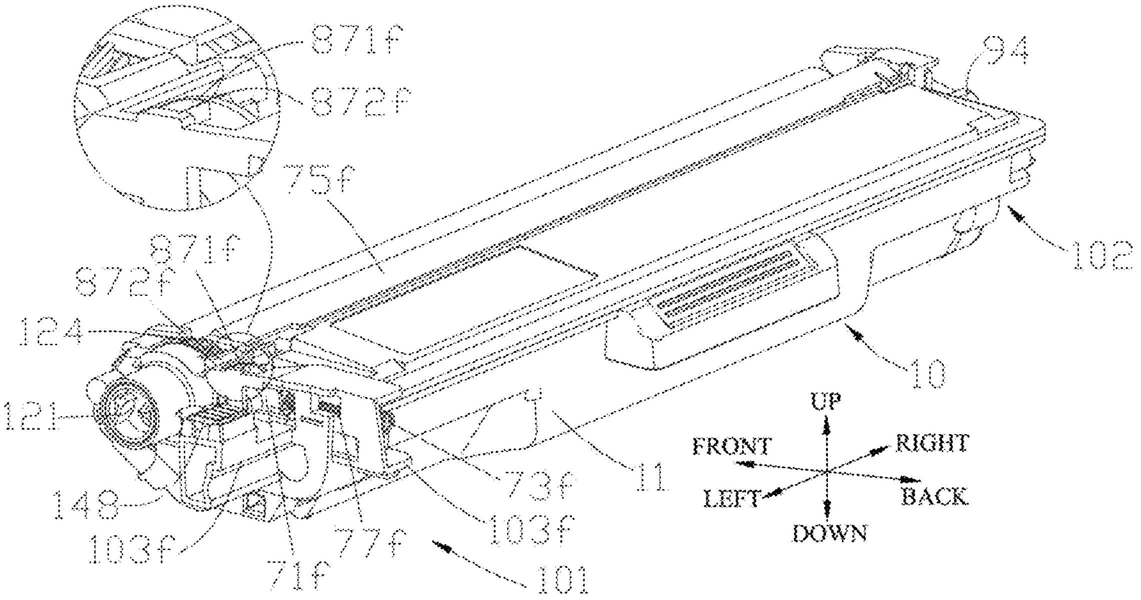
FIG. 33 is an overall structural view of the developing cartridge of Embodiment 7 in the present disclosure.
Figure 34:
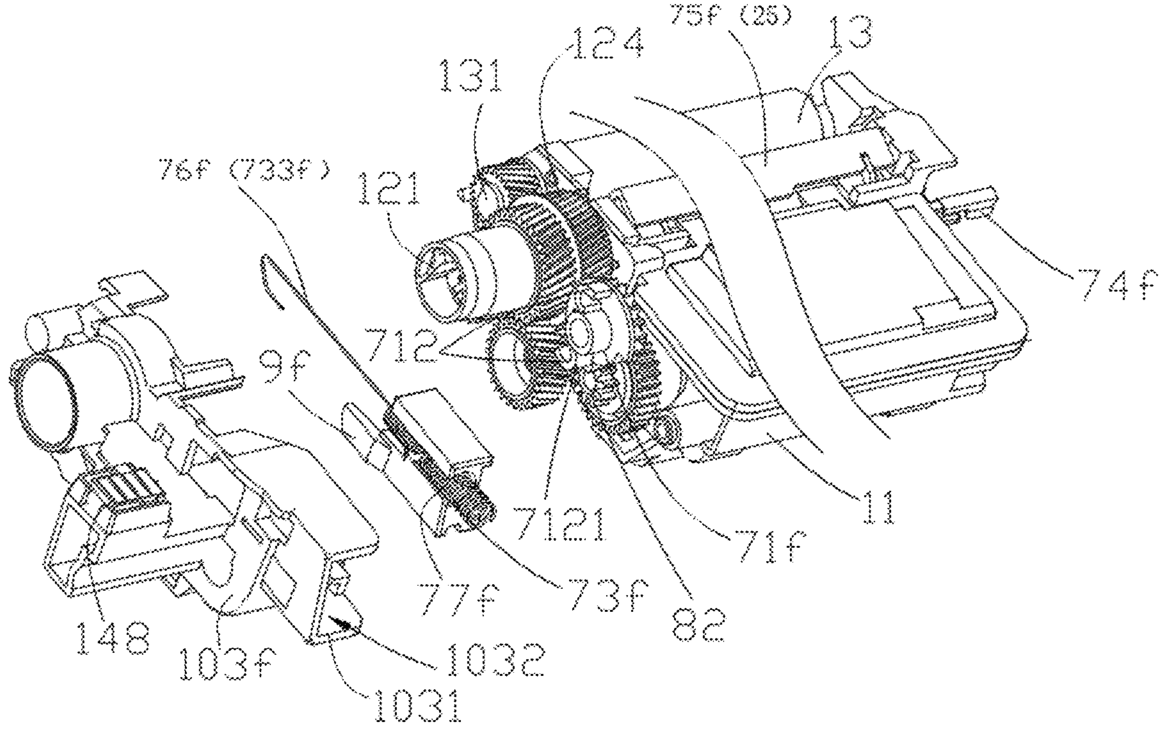
FIG. 34 is an exploded partial structural view of the developing cartridge of Embodiment 7 in the present disclosure.
Figure 35:
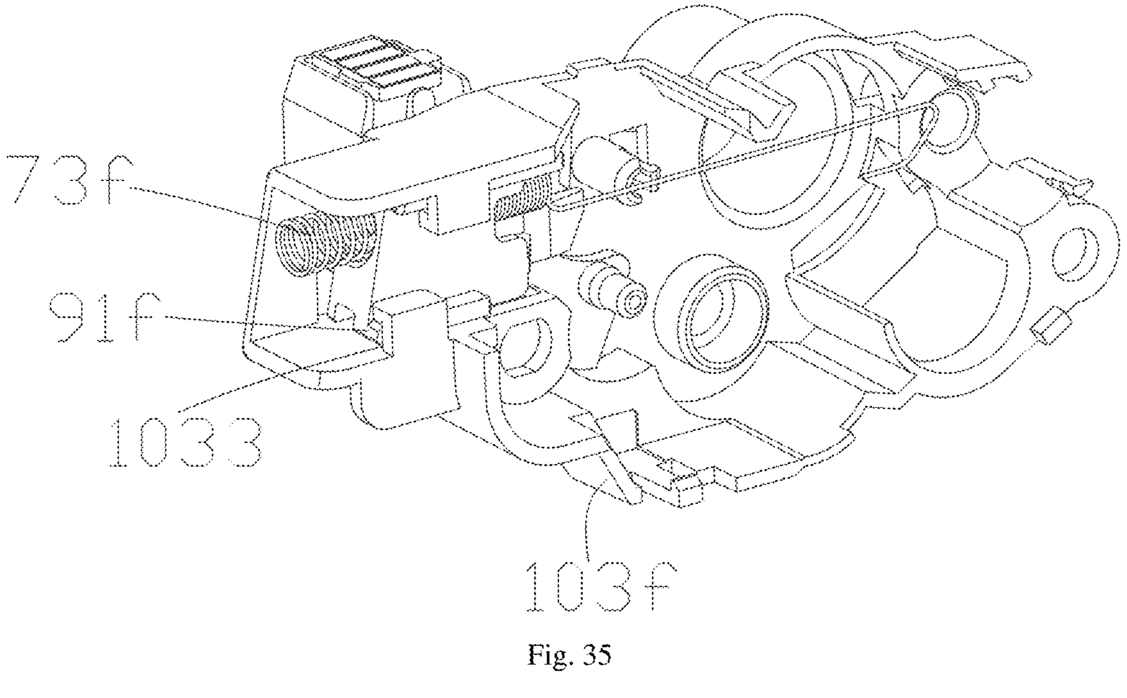
FIG. 35 is a structural view showing the assembled state of the first end cover, movable member, third conductive member and fourth conductive member of the developing cartridge of Embodiment 7 in the present disclosure.
Figure 36:
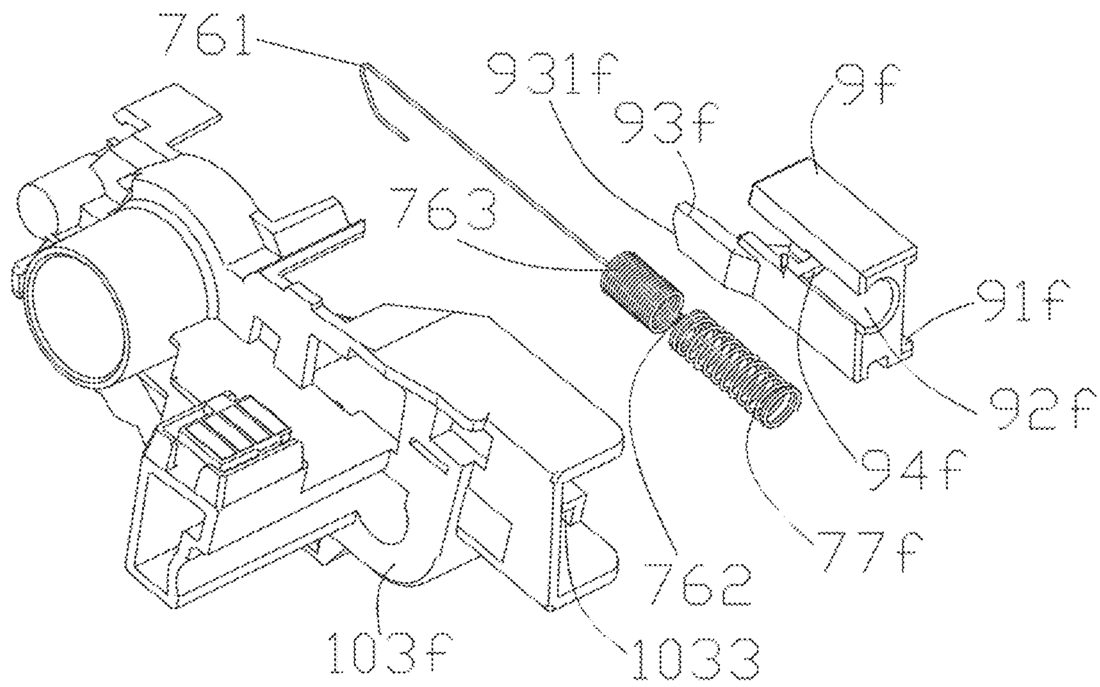
FIG. 36 is a structural view showing the disassembled state of the first end cover, movable member, third conductive member and fourth conductive member of the developing cartridge of Embodiment 7 in the present disclosure.

As illustrated in FIGS. 30-32, in this embodiment, the conductive assembly achieves grounding through electrical connection with the ground terminal 142 of the storage unit 14. Specifically, the fourth conductive member 77*e* establishes electrical connection with the ground terminal 142 of the storage unit 14, achieving grounding through the connection between the ground terminal 142/fourth conductive member 77*e* and the contact pin of the imaging device P.

As shown in the figures, this embodiment further comprises a second voltage control member 9, which controls the voltage/current value of the developing roller 13. Preferably, the second voltage control member 9 controls the circuit voltage/current value through making and breaking the circuit. The second voltage control member 9 can receive external force to move between a fifth position and a sixth position. In the fifth position, the developing roller establishes electrical connection with the grounding terminal, while in the sixth position, the developing roller is not electrically connected to the grounding terminal. In this embodiment, the second conductive member 75*e* is the developing roller 13.

The first conductive member 74*e* maintains electrical connection with the developing roller 13, which in turn electrically connects to the third conductive member 76*e*, and the third conductive member 76*e* electrically connects to the fourth conductive member 77*e*. The first conductive member 74*e* can establish electrical connection with the power supply electrode of the imaging device, which supplies electrical power to the developing roller. Specifically, this power supply electrode may be the switching member 503. In some embodiments, the power supply electrode may be configured as an independently disposed component.

Preferably, the second voltage control member 9 is configured as a movable member capable of movement between the fifth and sixth positions. In the fifth position, the second voltage control member 9 drives the third conductive member 76*e* and/or fourth conductive member 77*e* to establish an electrically connected state between the third conductive member 76*e* and the fourth conductive member 77*e*. In the sixth position, the second voltage control member 9 does not drive the third conductive member 76*e* and/or fourth conductive member 77*e*, leaving the third conductive member 76*e* and the fourth conductive member 77*e* in an electrically non-connected state.

The second voltage control member 9 is configured to move in response to movement of the separation force applying member of the imaging device P or the separation force transmission member 206 of the drum cartridge. It can directly or indirectly drive at least a portion of the third conductive member 76*e* and/or fourth conductive member 77*e*, enabling switching between contact and non-contact states between the third conductive member 76*e* and the fourth conductive member 77*e*. In other words, the third conductive member 76*e* can switch between contact and non-contact states with the fourth conductive member 77*e*.

The second voltage control member 9 can be rotatably connected to the developing frame 11 either directly or indirectly. In this embodiment, the second voltage control member 9 is rotatably mounted at the first end portion 101 of the developing cartridge 10. The second voltage control member 9 is configured as a rotary member comprising a third main body portion 90, second force receiving portion 92, and second driving portion 91. The second force receiving portion 92 is disposed on the third main body portion 90 to receive actuating force from the separation force applying member or separation force transmission member 206, enabling rotation of the second voltage control member 9. The second driving portion 91, also mounted on the third main body portion 90, can drive at least a portion of the third conductive member 76*e* and/or fourth conductive member 77*e* to establish electrical contact between the third conductive member 76*e* and the fourth conductive member 77*e*.

During imaging operations of the developing cartridge 10, the first conductive member 74*e* establishes electrical connection with the switching member 503 and receives electrical power. At this time, the developing roller 13 receives a voltage value of U3, while the ground terminal 142 of the storage unit 14 maintains electrical connection with the contact pin of the imaging device P. The third conductive member 76*e* and fourth conductive member 77*e* remain in a non-contact state.

When the developing cartridge 10 executes a photosensitive drum 201 cleaning operation, the separation force applying member or separation force transmission member 206 applies force to the second voltage control member 9, causing it to rotate. As the second voltage control member 9 rotates, the second driving portion 91 drives the third conductive member 76*e* into electrical contact with the fourth conductive member 77*e*, at which point the developing roller 13 voltage value changes to U4. The values U3 and U4 differ; when the voltage is U3, developer from the developing roller 13 can transfer to the photosensitive drum 201 surface; however, at voltage U4, developer from the developing roller 13 does not transfer to the photosensitive drum 201, thereby facilitating cleaning of the photosensitive drum 201 without developer accumulation during the cleaning process. The absolute value of U3 exceeds that of U4, with U4 preferably being 0.

Upon completion of cleaning, when the separation force applying member or separation force transmission member 206 no longer applies force to the second voltage control member 9, the second voltage control member 9 rotates in the reverse direction under the force of a second elastic reset member, returning the third conductive member 76*e* and fourth conductive member 77*e* to an electrically non-connected state.

This structural configuration of the developing cartridge 10 reduces the risk of developer adhesion during photosensitive drum 201 cleaning operations, thereby improving cleaning effectiveness. Furthermore, this cartridge structure eliminates the need for complex separation mechanisms and does not require separation between the photosensitive drum and developing roller.

In certain embodiments, the conductive assembly 72*e* may be configured to achieve grounding through electrical connection with at least one of: the first upper wall P41, second upper wall P42, or door P2's inner wall of the imaging device P.

In some embodiments, the first voltage control member 71*d* and second voltage control member 9 may be configured as components that adjust circuit resistance, controlling circuit voltage/current values through resistance modification.

Throughout these embodiments and their variations, "driving" encompasses both direct and indirect driving mechanisms, while "connection" encompasses both direct and indirect connections.

Some embodiments may feature a developing cartridge without a first voltage control member, incorporating only the second voltage control member 9.

Conversely, other embodiments may include the first voltage control member while omitting the second voltage control member 9.

In certain embodiments, the second voltage control member 9 may modify the developing roller's voltage by controlling the electrical contact and non-contact between the conductive assembly and at least one of the first upper wall P41, second upper wall P42, or door P2's inner wall of the imaging device P. Specifically, this voltage modification of the developing roller may be achieved through the contact and non-contact between the fourth conductive member 77*e* and the aforementioned grounding terminals.

This embodiment may be integrated with Embodiments 1-5, and the second voltage control member may be incorporated into any of Embodiments 1-5.

The electrical connections described in the present disclosure may be implemented as either direct or indirect electrical connections.

Embodiment 7

This embodiment represents a further advancement of Embodiment 4. Common elements between the embodiments will not be repeated; only substantive differences will be detailed. The specification drawings from previous embodiments may be referenced for identical components.

As shown in FIGS. 1-5*b* and FIGS. 33-36, in this embodiment, the conductive assembly can establish electrical connection with the switching member, while being capable of transitioning between electrically connected and non-connected states with the grounding terminal. Specifically, the first voltage control member 71*f* governs selective contact between the conductive assembly and grounding terminal K, enabling the first electrical connection portion 73*f* of the conductive assembly to switch between states of electrical contact and non-contact with grounding terminal K.

The conductive assembly in this embodiment comprises first conductive member 74*f*, second conductive member 75*f*, third conductive member 76*f*, and fourth conductive member 77*f*. The first conductive member 74*f* maintains electrical connection with the second conductive member 75*f* and can establish electrical connection with switching member 503 upon installation in imaging device P. In this embodiment, the first conductive member 74*f* is fabricated from conductive metal.

The second conductive member 75*f* extends from the first end portion 101 to the second end portion 102 of the developing cartridge 10, maintaining electrical connection with the third conductive member 76*f*. It may incorporate at least one of the following components: developing roller shaft 132, developing roller 13, supply roller 15, doctor blade 25, or may at least include an independent conductive component separate from developing roller 13, supply roller 15 and doctor blade 25. In this embodiment, the doctor blade 25 serves as the second conductive member 75*f*.

The third conductive member 76*f* is positioned at the first end portion 101 of the developing cartridge 10 and maintains electrical connection with the fourth conductive member 77*f*, which in turn can connect to grounding terminal K. Preferably, the third conductive member 76*f* and fourth conductive member 77*f* are either integrally formed or fixedly connected.

In certain embodiments, the third conductive member 76*f* is configured to remain within the interior of the first end cover 103*f* or developing frame 11, preventing protrusion beyond the exterior of the developing cartridge from the first end cover 103*f* or developing frame 11. This configuration design protects the third conductive member 76*f* from potential damage caused by external component interference. More specifically, the third conductive member 76*f* incorporates multiple bend portions to navigate around blocking structures present on the first end cover 103*f* or developing frame 11.

The first electrical connection portion 73*f* of the fourth conductive member 77*f* is configured to move between a first position and a second position. In the first position, the first electrical connection portion 73*f* protrudes relative to the developing frame 11 or first end cover 103*f*, enabling electrical contact with grounding terminal K in the first position. In the second position, the first electrical connection portion 73*f* retracts relative to the first position, preferably retracting relative to the developing frame 11 or first end cover 103*f*. The first electrical connection portion 73*f* features elastic deformability, enabling resilient electrical contact with grounding terminal K (door), thereby enhancing contact stability.

In this embodiment, the third conductive member 76*f* can function as the first reset member 733*f*, forcing the first electrical connection portion 73*f* to move from the first position to the second position, that is, the third conductive member 76*f* can be considered as the first reset member 733*f*. The third conductive member 76*f* incorporates first connection end 761, second connection end 762, and elastic portion 763. The first connection end 761 connects electrically to the second conductive member 75*f*, while the second connection end 762 connects electrically to the fourth conductive member 77*f*. The elastic portion 763 connects the first connection end 761 to the second connection end 762. The elastic portion 763 stretches when the first electrical connection portion 73*f* moves from the second position to the first position, and its elastic recovery force returns the first electrical connection portion 73*f* from the first position to the second position. Specifically, when the first electrical connection portion 73*f* moves from the second position to the first position under the drive of the first voltage control member 71*f*, the elastic portion 763 stretches. When the first voltage control member 71*f* ceases driving the first electrical connection portion 73*f* (whether directly or indirectly), the elastic portion 763 returns to its original state, pulling the first electrical connection portion 73*f* back to the second position from the first position.

Viewed from the front-rear direction of the developing cartridge 10, the first electrical connection portion 73*f* at least partially overlaps with the first voltage control member 71*f*. Along the left-right direction of the developing cartridge 10, the first electrical connection portion 73*f* is positioned between the sixth gear portion 124 and the electrical contacts of storage unit 148. Preferably, the first electrical connection portion 73*f* is positioned between the sixth gear portion 124 and the first force receiving portion 121.

The first end cover 103*f* of this embodiment covers at least a portion of the fourth conductive member 77*f* and features an opening portion 1031 and an accommodation cavity 1032. The opening portion 1031, situated on the rear side of the first end cover 103*f* and facing toward the rear of the developing cartridge 10, allows the first electrical connection portion 73*f* to extend outward. When the first electrical connection portion 73*f* occupies the first position, at least part of it extends beyond the opening portion 1031. In the second position, the first electrical connection portion 73*f* remains within the opening portion 1031. The accommodation cavity 1032, located between storage unit 148 and developing frame 11, accommodates the fourth conductive member 77*f*.

This structural configuration, where the first end cover 103*f* covers at least a portion of the fourth conductive member 77*f*, provides enhanced protection for the fourth conductive member 77*f* by the first end cover 103*f*. Additionally, during packaging operations of the developing cartridge 10, the first electrical connection portion 73*f* of the first conductive member 74*f* is in the second position, which can avoid the first electrical connection portion 73*f* puncturing the packaging material, thereby reducing the difficulty and cost of packaging.

The developing cartridge 10 further incorporates a movable member 9*f* that supports at least a portion of either the fourth conductive member 77*f* or the first electrical connection portion 73*f*. This movable member 9*f* can move relative to the developing frame 11 of the developing cartridge 10. In this embodiment, the movable member 9*f* is specifically configured to slide in the front-rear direction relative to the developing frame 11, preferably mounted in a sliding configuration on the first end cover 103*f*. Alternative embodiments may position the movable member 9*f* on the developing frame 11. The movable member 9*f* may also move in either left-right or up-down directions, provided it can effectively switch between contact and non-contact states with grounding terminal K.

The movable member 9*f* comprises a connection portion 91*f*, a first accommodation portion 92*f*, a force receiving portion 93*f* and a second force applying portion 94*f*. The connection portion 91*f* enables sliding connection with the connected portion 1033 of the first end cover 103*f*. Specifically, at least one of the connection portion 91*f* and the connected portion 1033 functions as a sliding block, while the other one serves as a corresponding sliding groove.

The first accommodation portion 92*f* is configured to accommodate at least a portion of the fourth conductive member 77*f*, with the first electrical connection portion 73*f* able to extend through the opening of the first accommodation portion 92*f*. The force receiving portion 93*f* receives actuating force from the first voltage control member 71*f* to enable sliding movement of the movable member 9*f*. This force receiving portion 93*f* extends toward the developing roller 13, terminating in a force receiving surface 931*f*. The force receiving surface 931*f* is configured as an inclined plane facing both downward and forward. The second force applying portion 94*f* applies force to the fourth conductive member 77*f* to facilitate movement of the first electrical connection portion 73*f* from the second position to the first position. Specifically, the fourth conductive member 77*f* abuts against the second force applying portion 94*f*.

In this embodiment, the first driving portion 712 of the first voltage control member 71*f* incorporates an arcuate drive surface 7121. This arcuate drive surface 7121 works in conjunction with the force receiving surface 931*f* to enable sliding movement of the movable member 9*f*. The cooperation between the arcuate drive surface 7121 and the force receiving surface 931*f* ensures smoother driving action.

In this embodiment, the developing cartridge 10 also features a reset mechanism that allows users to return the detectable device to its initial state before detection. In this embodiment, the reset mechanism comprises a first indicator position 871*f* provided on the first voltage control member 71*f* and a second indicator position 872*f* provided on the first end cover 103*f*. When the first indicator position 871*f* and the second indicator position 872*f* are aligned, the first voltage control member 71*f* is in its initial position, and the detectable device is in its initial state before detection. Specifically, the first indicator position 871*f* is a first surface provided on the first driving portion 712, while the second indicator position 872*f* is a second surface provided on the upper side of the end cover. When the first surface and the second surface are flush, the first voltage control member 71*f* is in its initial position, and the detectable device is in its initial state before detection.

Referring to FIG. 20, when the developing cartridge 10 is not installed in the imaging device P, the switching member 503 remains in its non-conducting open position. Referring to FIG. 21, upon installation of the developing cartridge 10 in the imaging device P, the swing arm 504, responding to force from the second force applying portion 94*f*, moves the switching member 503 from its open position to the closed position. At this stage, while the detectable device is not conducting with grounding terminal K, the detection unit registers a voltage value of U1.

Referring to FIG. 22, when detection of the developing cartridge 10 commences, the first driving portion 712 pushes the movable member 9*f* rearward. The second force applying portion 94*f* of the movable member 9*f* then applies force to the fourth conductive member 77*f*, causing the first electrical connection portion 73*f* to move rearward from the second position to the first position. As the first electrical connection portion 73*f* makes contact with grounding terminal K, the elastic portion 763 undergoes stretching, and the detection unit registers a voltage value of U2.

When the first driving portion 712 ceases pushing the movable member 9*f*, the elastic recovery force of elastic portion 763 acts on the fourth conductive member 77*f*, returning the first electrical connection portion 73*f* from the first position to the second position. Simultaneously, the movable member 9*f* moves forward under the force of the fourth conductive member 77*f*, breaking electrical contact between the first electrical connection portion 73*f* and grounding terminal K. The detection unit then registers a voltage value of U1. The values of U1 and U2 are different, and the detection unit detects the variation in the voltage signal. When the first driving portion 712 drives the movable member 9*f* again, the first electrical connection portion 73*f* and the grounding terminal K switch between contact and non-contact states once more. The detection unit detects the variation in voltage value to determine the information of the developing cartridge 10. When users need to reset the detectable device, they only need to rotate the first voltage control member 71*f* to align the first surface with the second surface.

The grounding terminal K may be at least one of: the storage unit's ground terminal, the imaging device's contact pin that connects with the ground terminal, the door P2's inner wall, the device's side wall, the first upper wall P41, and the grounding conductive members P311.

In certain embodiments, at least two of the first conductive member 74*f*, second conductive member 75*f*, third conductive member 76*f*, and fourth conductive member 77*f* may be integrally formed. When the first conductive member 74*f*, second conductive member 75*f*, third conductive member 76*f*, and fourth conductive member 77*f* are integrally formed, the conductive assembly may take the form of a single conductive wire, conductive metal wire, conductive resin or the like.

In some embodiments, at least one of the first conductive member 74*f*, second conductive member 75*f*, third conductive member 76*f*, and fourth conductive member 77*f* may incorporate multiple separately configured conductive components.

In certain embodiments, the conductive assembly supplies received electrical power to at least one of the developing roller, doctor blade, or supply roller; that is, the conductive assembly is electrically connected to at least one of the developing roller, doctor blade, and supply roller.

In some embodiments, the conductive assembly is not electrically connected to at least one of the developing roller, the doctor blade, and the supply roller; the developing roller is electrically connected to the switching member 503 or the power supply component of the imaging device through an electrical connection component that is independent of the conductive assembly. The electrical connection component can make electrical contact with the switching member 503 without contacting the conductive assembly.

In some embodiments, upon detection of the developing cartridge is complete, the fourth conductive member 77*f* abuts against the first voltage control member 71*f* to prevent the first voltage control member 71*f* from further rotating or reversing and engaging with the transmission member (such as the second transmission member 82) again.

Embodiment 8

This embodiment represents a further advancement of the technical solutions presented in Embodiments 1-7. Common elements will not be repeated, and relevant illustrations from previous embodiments may be referenced for identical components.

In the process of implementing the technical solution, it was discovered through experimentation that, due to the elastic contact between the first electrical connection portion and the grounding terminal K, when the first electrical connection portion moves from a position where it is not in contact with the grounding terminal K to a position where it is in contact with the grounding terminal K (for example, when the first electrical connection portion moves from the second position to the first position), the first electrical connection portion may experience sliding or bouncing movements relative to the grounding terminal K. This can lead to unnecessary fluctuations in detection electrical signals, or poor contact quality, which could lead to detection failure.

Figure 37:
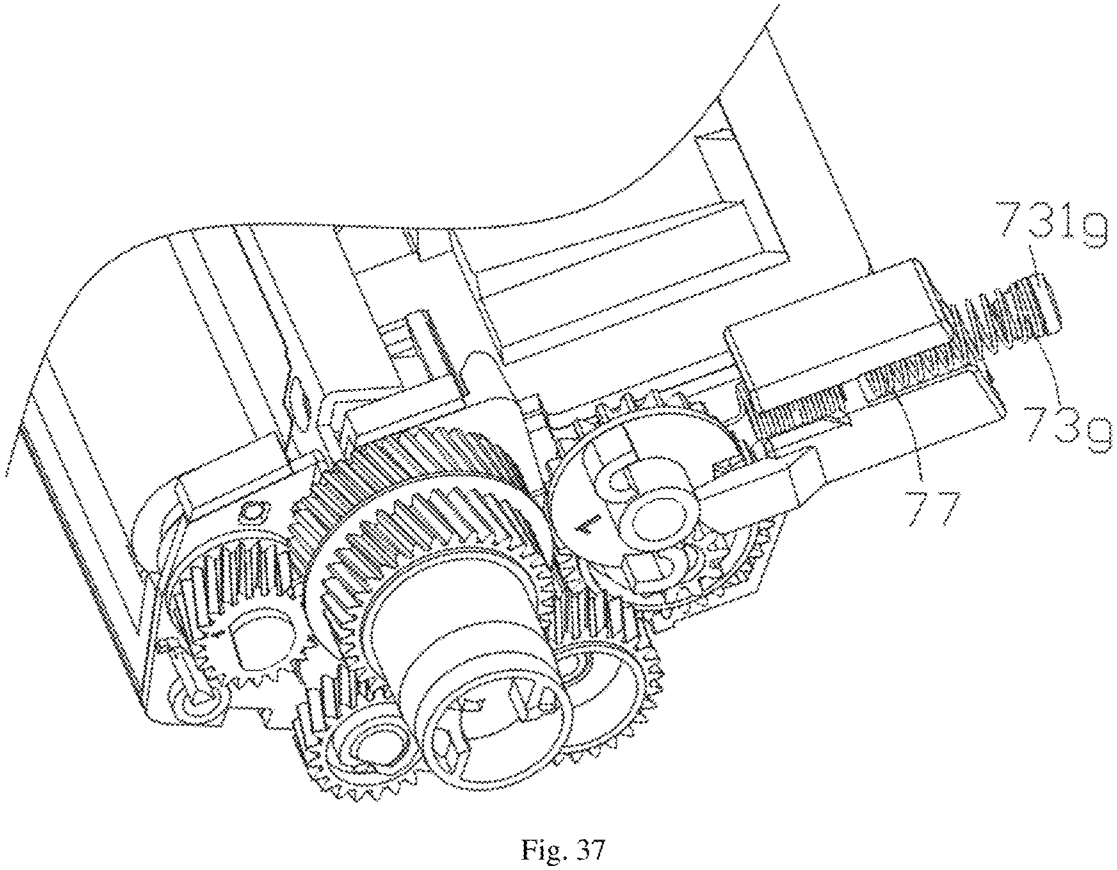
FIG. 37 is a partial structural view of one end of the developing cartridge of Embodiment 8 in the present disclosure.
Figure 38:
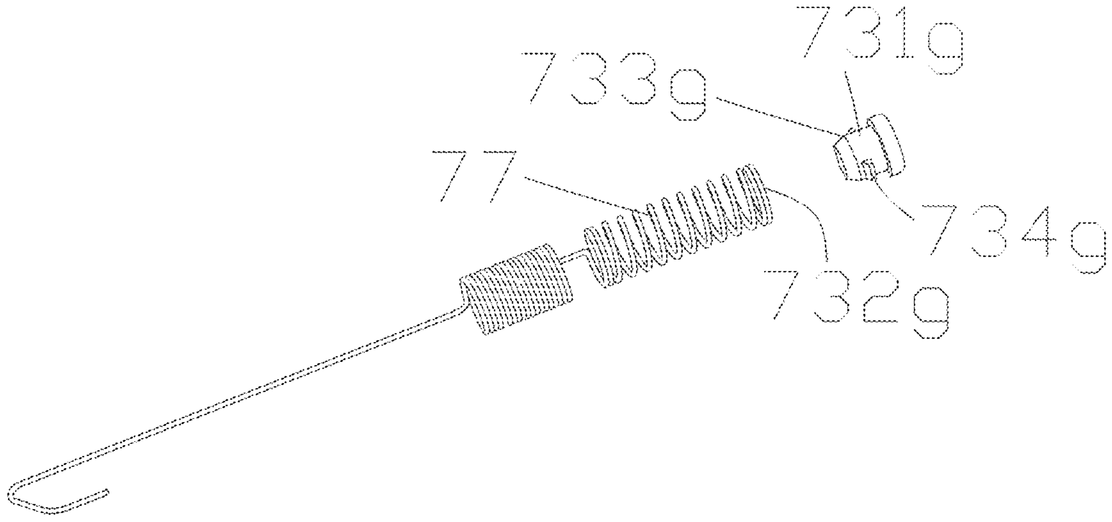
FIG. 38 is a partial structural view of the third conductive member and fourth conductive member of Embodiment 8 in the present disclosure.

As illustrated in FIGS. 37 and 38, this embodiment addresses the aforementioned technical challenge by incorporating an anti-slip portion 731*g* on the first electrical connection portion 73*g*. This anti-slip portion 731*g* prevents sliding or bouncing movements of the first electrical connection portion 73*g* relative to grounding terminal K during contacting the grounding terminal K, thereby enhancing the stability of electrical contact between the first electrical connection portion 73*g* and grounding terminal K. This avoids unnecessary fluctuations in detection electrical signals or poor electrical contact, which could lead to detection failure.

The first electrical connection portion 73*g* includes an anti-slip portion 731*g* and an mounting portion 732*g*. The mounting portion 732*g* is used for mounting the anti-slip portion 731*g*, and one end of the anti-slip portion 731*g* forms an assembly end 733*g*. The anti-slip portion 731*g* can be assembled onto the mounting portion 732*g* through the assembly end 733*g*. In this embodiment, the assembly end 733*g* is formed with a snap-fit structure 734*g*, which engages with the mounting portion 732*g* to prevent detachment of the anti-slip portion 731*g*.

The mounting portion 732*g* is formed at one end of the fourth conductive member 77. The anti-slip portion 731*g* is at least partially made of elastic conductive material, such as elastic conductive rubber. The elastic conductive rubber does not slip or bounce when it abuts against the grounding terminal K (e.g., the inner wall of the door, the side wall of the device, the first upper wall, and the grounding conductive member, etc.). The fourth conductive member 77 is configured as a spring, and when viewed along the axial direction of the fourth conductive member 77, the anti-slip portion 731*g* covers the mounting portion 732*g*. In this embodiment, by providing the anti-slip portion 731*g*, the contact area between the first electrical connection portion 73*g* and the grounding terminal K can also be increased, thereby enhancing the stability of the electrical contact. Moreover, by using elastic conductive rubber as the anti-slip portion 731*g*, it can avoid puncturing the packaging bag when packaging the developing cartridge.

Some embodiments feature anti-slip stripes on the end surface of the anti-slip portion 731*g* to increase frictional resistance.

In some embodiments, the anti-slip portion 731*g* is made of other materials with anti-slip properties, such as conductive silicone, provided they enhance frictional force during contact with grounding terminal K.

Figure 39:
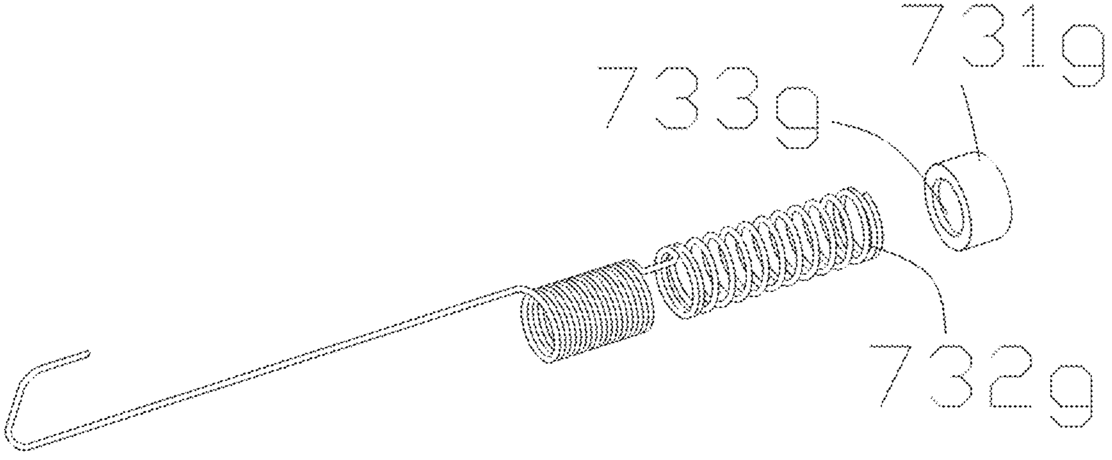
FIG. 39 is a partial structural view showing the third conductive member and fourth conductive member of a variation of Embodiment 8 in the present disclosure.

FIG. 39 illustrates a structural variation of the anti-slip portion 731*g* in a variant of this embodiment, where the assembly end 733*g* of the anti-slip portion 731*g* forms a chamber structure. This chamber structure enables the assembly end 733*g* to sleeve over the exterior of the mounting portion 732*g*, preventing detachment of the anti-slip portion 731*g*.

The embodiments described above may be combined in various ways while remaining within the protective scope of the present disclosure.

Finally, it should be noted that the above embodiments are intended to illustrate the technical solutions of the present disclosure rather than impose limitations. In order to distinguish different components, the present disclosure introduces terms such as "first" and "second". These terms are not to be understood as quantity limitations. For example, the driving member described in the present disclosure has a sixth gear portion, but this does not necessarily mean that the driving member must have a first gear portion and a third gear portion, etc. According to the description in the specification, the components described as "first", "second", etc., may be singular or plural. Directional terms such as "upper", "upper side", "lower", and "lower side" are based on the description in the accompanying drawings and are not specific limitations on their orientation. Although the present disclosure has been described in detail with reference to the foregoing embodiments, those of ordinary skill in the art should understand that they can still modify the technical solutions described in the foregoing embodiments, or make equivalent replacements of some or all of the technical features; and these modifications or replacements do not cause the essence of the corresponding technical solutions to depart from the scope of the technical solutions of the embodiments of the present disclosure.

What is claimed is:

1. A developing cartridge, comprising:

a developing frame internally provided with a developer chamber configured to accommodate developer;

a developing roller rotatably disposed on the developing frame;

a first drive force receiving member configured to receive a driving force for driving rotation of the developing roller;

a first end cover, connected to the developing frame and at least partially covering the first drive force receiving member;

a conductive assembly capable of switching internally between an electrically connected state and an electrically non-connected state, wherein the conductive assembly is provided with a first electrical connection portion that is elastically deformable; and a first voltage control member mounted on the first end cover and configured to move in response to movement of the first drive force receiving member, thereby switching the conductive assembly between the electrically connected state and the electrically non-connected state.

2. The developing cartridge according to claim 1, wherein the developing cartridge is detachably installable in an imaging device, the imaging device further comprises an openable door, the door has a groundable first inner wall, and the first electrical connection portion is configured to electrically contact the first inner wall.

3. The developing cartridge according to claim 2, wherein the first electrical connection portion comprises an anti-slip portion, the anti-slip portion abuts the first inner wall, and at least a portion of the anti-slip portion is made of an elastic conductive material.

4. The developing cartridge according to claim 1, wherein the first electrical connection portion is configured to move in a front-rear direction of the developing cartridge.

5. The developing cartridge according to claim 1, wherein the first electrical connection portion is configured to move between a first position and a second position under an external force; in the first position, the first electrical connection portion protrudes relative to the developing frame, and in the second position, the first electrical connection portion is retracted relative to the first position.

6. The developing cartridge according to claim 1, wherein the first electrical connection portion is disposed on the first end cover, and viewed from a front-rear direction of the developing cartridge, the first electrical connection portion at least partially overlaps with the first voltage control member.

7. The developing cartridge according to claim 1, wherein, along a longitudinal direction of the developing cartridge, the developing cartridge has a first end portion and an opposing second end portion, the conductive assembly comprises a first conductive member, a second conductive member, a third conductive member, and a fourth conductive member, the first conductive member is disposed at the second end portion, the second conductive member is electrically connected to the first conductive member, the third conductive member is electrically connected to the second conductive member and configured to connect to the fourth conductive member; at least a portion of the second conductive member extends between the first end portion and the second end portion of the developing cartridge, at least a portion of the third conductive member is disposed at the first end portion of the developing cartridge; the fourth conductive member includes the first electrical connection portion;

the first voltage control member comprises a first main body portion, a first drive force receiving portion, and a first driving portion, the first drive force receiving portion is disposed on the first main body portion and configured to receive a driving force; the first driving portion is disposed on the first main body portion and is capable of driving the third conductive member or the fourth conductive member so that the third conductive member and the fourth conductive member is capable of switching between the electrically connected state and the electrically non-connected state.

8. The developing cartridge according to claim 7, wherein the first conductive member, the second conductive member, the third conductive member and the fourth conductive member are separately formed or at least two are integrally formed.

9. The developing cartridge according to claim 7, wherein the fourth conductive member comprises a first sub-member and the first electrical connection portion, and the first sub-member is provided with a first sub-gear.

10. The developing cartridge according to claim 7, wherein the developing cartridge further comprises a supply roller rotatably supported on the developing frame and configured to supply developer to the developing roller, wherein the second conductive member is the supply roller.

11. A developing cartridge, comprising:

a developing frame internally provided with a developer chamber configured to accommodate developer;

a developing roller rotatably disposed on the developing frame;

a first drive force receiving member configured to receive a driving force for driving rotation of the developing roller;

a first end cover, connected to the developing frame and at least partially covering the first drive force receiving member;

a conductive assembly capable of switching internally between an electrically connected state and an electrically non-connected state, wherein the conductive assembly is provided with a first electrical connection portion that is elastically deformable; and a first voltage control member configured to move in response to movement of the first drive force receiving member, thereby switching the conductive assembly between the electrically connected state and the electrically non-connected state.

12. The developing cartridge according to claim 11, wherein the developing cartridge is detachably installable in a drum cartridge having a photosensitive drum, the drum cartridge is detachably installable in an imaging device, the drum cartridge comprises a separation force transmission member, and the developing cartridge comprises a separation force receiving member configured to receive an acting force from the separation force transmission member or a separation force applying member of the imaging device to separate the developing roller from the photosensitive drum, before separation of the developing roller from the photosensitive drum, the first electrical connection portion has a first deformation amount, and after separation of the developing roller from the photosensitive drum, the first electrical connection portion has a second deformation amount, the first deformation amount is greater than the second deformation amount.

13. The developing cartridge according to claim 11, wherein the developing cartridge is detachably installable in a drum cartridge having a photosensitive drum, the drum cartridge is detachably installable in a main assembly of an imaging device, and the main assembly comprises a main frame and a mounting cavity configured to mount the developing cartridge, the main frame comprises a first upper wall and a second upper wall, the second upper wall is closer to an inside of the mounting cavity than the first upper wall, the first upper wall is made of a conductive material, the second upper wall is made of a non-conductive material, and the first electrical connection portion is configured to electrically connect with the first upper wall.

14. The developing cartridge according to claim 13, wherein the first upper wall comprises a plurality of labels, there is a first gap between the labels and the second upper wall, there is a second gap between the plurality of labels, and the first electrical connection portion makes electrical contact with the first gap or the second gap.

15. The developing cartridge according to claim 11, wherein the developing cartridge is detachably installable in a drum cartridge having a photosensitive drum, the drum cartridge is detachably installable in an imaging device, and the developing cartridge further comprises a storage unit having a ground terminal capable of electrically connecting with a contact pin of the imaging device, and the first electrical connection portion is capable of electrically connecting with the ground terminal.

16. The developing cartridge according to claim 11, wherein, along a longitudinal direction of the developing cartridge, the developing cartridge has a first end portion and an opposing second end portion, the conductive assembly comprises a first conductive member, a second conductive member, a third conductive member, and a fourth conductive member, the first conductive member is disposed at the second end portion, the second conductive member is electrically connected to the first conductive member, the third conductive member is electrically connected to the second conductive member and configured to connect to the fourth conductive member; at least a portion of the second conductive member extends between the first end portion and the second end portion of the developing cartridge, at least a portion of the third conductive member is disposed at the first end portion of the developing cartridge; the fourth conductive member includes the first electrical connection portion;

the first voltage control member comprises a first main body portion, a first drive force receiving portion, and a first driving portion, the first drive force receiving portion is disposed on the first main body portion and configured to receive a driving force; the first driving portion is disposed on the first main body portion and is capable of driving the third conductive member or the fourth conductive member so that the third conductive member and the fourth conductive member is capable of switching between the electrically connected state and the electrically non-connected state.

17. The developing cartridge according to claim 16, wherein the first conductive member, the second conductive member, the third conductive member and the fourth conductive member are separately formed or at least two are integrally formed.

18. The developing cartridge according to claim 16, wherein the imaging device comprises a detection device and a grounding terminal, the detection device comprises a detection unit, a power source and a switching member capable of forming a conductive circuit, the switching member is movable between a closed position and an open position, and the conductive assembly is capable of electrically connecting the switching member and the grounding terminal.

19. The developing cartridge according to claim 18, further comprising a first force applying portion disposed on the first conductive member or formed separately from the first conductive member, wherein the first force applying portion is configured to apply a force to the switching member when the developing cartridge is installed in the imaging device to move the switching member from an initial position to the closed position.

20. The developing cartridge according to claim 11, further comprising a deceleration mechanism disposed at a first end portion of the developing cartridge, wherein the deceleration mechanism comprises at least a first transmission member and a second transmission member, the first transmission member comprises a third gear portion and a fourth gear portion, a diameter of the third gear portion is smaller than that of the fourth gear portion, the second transmission member comprises a fifth gear portion and a second gear portion, the fourth gear portion meshes with a first gear portion of the first drive force receiving member, the third gear portion meshes with the fifth gear portion, and the second gear portion meshes with a first drive force receiving portion of the first voltage control member.

* * * * *